United States Patent
Yang et al.

(10) Patent No.: US 11,902,191 B2
(45) Date of Patent: Feb. 13, 2024

(54) DISTRIBUTED RESOURCE UNIT CONFIGURATIONS

(71) Applicant: QUALCOMM Incorporated, San Diego, CA (US)

(72) Inventors: Lin Yang, San Diego, CA (US); Bin Tian, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 169 days.

(21) Appl. No.: 17/089,303

(22) Filed: Nov. 4, 2020

(65) Prior Publication Data

US 2021/0143955 A1    May 13, 2021

Related U.S. Application Data

(60) Provisional application No. 62/932,454, filed on Nov. 7, 2019.

(51) Int. Cl.
*H04L 5/00* (2006.01)
*H04W 72/0453* (2023.01)
*H04W 72/1263* (2023.01)

(52) U.S. Cl.
CPC ....... *H04L 5/0048* (2013.01); *H04W 72/0453* (2013.01); *H04W 72/1263* (2013.01)

(58) Field of Classification Search
CPC . H04L 5/0048; H04L 5/0023; H04L 27/2647; H04L 5/0062; H04L 27/2657;

(Continued)

(56) References Cited

U.S. PATENT DOCUMENTS 9,844,028 B2    12/2017 Yang et al.
2010/0091680 A1*    4/2010 Chun ............... H04L 5/0023
                                                      370/252

(Continued)

FOREIGN PATENT DOCUMENTS

WO    2016025817 A1    2/2016

OTHER PUBLICATIONS

Bintian(Qualcomm}): "11ax OFDMA Tone Plan Leftover Tones and Pilot Structure", IEEE Draft; vol. 802.11ax, No. 1, Jul. 13, 2015, pp. 1-32, XP068157723. (Year: 2015).*

(Continued)

*Primary Examiner* — Ayaz R Sheikh
*Assistant Examiner* — Louis Samara
(74) *Attorney, Agent, or Firm* — Holland & Hart LLP

(57) ABSTRACT

This disclosure provides methods, devices and systems for configuring tones for a distributed resource unit (RU) across a channel bandwidth to improve frequency diversity and available transmit power. A distributed RU may include a set of tones that may be allocated across a bandwidth that is greater than a bandwidth of the aggregate quantity of tones. The set of tones may include a set of data tones grouped into contiguous groups of one or more data tones and a set of non-contiguous pilot tones. The data tones may be mapped to useful tones over a center portion of a half-bandwidth of the channel. The pilot tones may be mapped near edge tones at edges of the channel bandwidth or near direct current tones at a center of the channel bandwidth. A system bandwidth may include one or more channel bandwidths associated with distributed RUs.

32 Claims, 12 Drawing Sheets

(58) Field of Classification Search
CPC ... H04L 27/2602; H04L 5/0098; H04L 5/003; H04L 27/2613; H04L 5/0046; H04W 72/0453; H04W 72/1263; H04W 72/042; H04W 72/044
See application file for complete search history.

(56) References Cited

U.S. PATENT DOCUMENTS

| | | | | |
|---|---|---|---|---|
| 2011/0249644 | A1* | 10/2011 | Boariu | H04W 72/23 455/450 |
| 2014/0185662 | A1* | 7/2014 | Azizi | H04L 27/2662 375/232 |
| 2016/0088599 | A1* | 3/2016 | Yang | H04L 5/0041 370/329 |
| 2016/0142187 | A1* | 5/2016 | Yang | H04L 5/0046 370/328 |
| 2017/0347340 | A1* | 11/2017 | Haley | H04L 25/03343 |
| 2019/0313424 | A1* | 10/2019 | Choi | H04L 5/0044 |
| 2020/0014509 | A1* | 1/2020 | Asterjadhi | H04L 5/0041 |
| 2021/0392660 | A1* | 12/2021 | Chen | H04L 27/2613 |
| 2022/0045812 | A1* | 2/2022 | Lim | H04L 5/0098 |

OTHER PUBLICATIONS

International Search Report and Written Opinion—PCT/US2020/059050—ISA/EPO—dated Feb. 18, 2021 (200190WO).

Yang L., et al., (Qualcomm): "11ax OFDMA Tone Plan Leftover Tones and Pilot Structure", IEEE Draft, 11-15-0819-01-00AX-11AX-OFDMA-Tone-Plan-Leftover-Tones-and-Pilot-Structure, IEEE-SA, Mentor, Piscataway, NJ USA, vol. 802.11ax, No. 1, Jul. 13, 2015 (Jul. 13, 2015), XP068157723, pp. 1-32, Retrieved from the Internet: URL:https://mentor.ieee.org/802.11/dcn/15/11-15-0819-01-00ax-11ax-ofdma-tone-plan-leftover-tones-and-pilot-structure.pptx. [retrieved on Jul. 13, 2015] slide 11 and 24.

* cited by examiner

DISTRIBUTED RESOURCE UNIT CONFIGURATIONS

CROSS REFERENCE

The present Application for Patent claims the benefit of U.S. Provisional Patent Application No. 62/932,454 by YANG et al., entitled "DISTRIBUTED RESOURCE UNIT CONFIGURATIONS," filed Nov. 7, 2019, assigned to the assignee hereof, and expressly incorporated by reference herein.

TECHNICAL FIELD

The following relates generally to wireless communications, and more specifically to distributed resource unit configurations.

DESCRIPTION OF THE RELATED TECHNOLOGY

A wireless local area network (WLAN) may be formed by one or more access points (APs) that provide a shared wireless communication medium for use by a quantity of client devices also referred to as stations (STAs). The basic building block of a WLAN conforming to the Institute of Electrical and Electronics Engineers (IEEE) 802.11 family of standards is a Basic Service Set (BSS), which is managed by an AP. Each BSS is identified by a Basic Service Set Identifier (BSSID) that is advertised by the AP. An AP periodically broadcasts beacon frames to enable any STAs within wireless range of the AP to establish or maintain a communication link with the WLAN.

Some wireless communications systems (for example, Wi-Fi or WLAN systems) may support allocating multiple resource units (RUs) over a channel bandwidth. These RUs may be used by devices (for example, one or more APs or one or more STAs) for communication of data and pilot signals. However, the configurations of some RUs (for example, the locations of the allocated data and pilot tones for each RU) may not efficiently utilize the available transmit power for a device (for example, a device may reduce power when communicating via one or more RUs) and improved techniques are desired.

SUMMARY

The systems, methods and devices of this disclosure each have several innovative aspects, no single one of which is solely responsible for the desirable attributes disclosed herein.

One innovative aspect of the subject matter described in this disclosure can be implemented in a method for wireless communication. The method can include techniques for distributing tones for a resource unit (RU) across a channel bandwidth to improve the frequency diversity and communication power for a wireless communication device. Each distributed RU may include a set of tones having an aggregate quantity of tones, and the tones for each RU may be allocated across a bandwidth (for example, a channel bandwidth) that includes a greater quantity of tones than the aggregate quantity of tones. In some examples, at least a set of data tones of the RU (for example, all or most of the data tones) may be organized into distributed groups of tones (for example, groups of one or more tones). A set of pilot tones of the distributed RU may be allocated a defined distance from one another and from data tones. As an example, the pilot tones may be allocated such that they are separated from each other and from data tones by a quantity of tones (for example, a minimum quantity of tones or a quantity of tones below a threshold).

In some examples, the methods and wireless communication devices may be configured such that the pilot tones may be mapped to the edges of the channel bandwidth (for example, bordering the edges of the data tones and a set of outer edge tones) or to a center of the channel bandwidth (for example, bordering inner edges of the data tones and a set of direct current (DC) tones).

In some examples, the methods and wireless communication devices may be configured such that the distributed RUs may be allocated to one or more stations (STAs) for communication with an access point (AP). In some examples, the methods and wireless communication devices may be configured such that all the distributed tones, including pilot tones and each group (for example, one or more) of data tones, may be within a threshold distance of other tones of the set of tones. In some examples, the methods and wireless communication devices may be configured such that a system bandwidth may include one or more channel bandwidths associated with distributed RUs and a channel bandwidth unassociated with distributed RUs (for example, associated with an RU that is not distributed, such as a large RU or a small RU that is not limited with respect to power spectral density).

Another innovative aspect of the subject matter described in this disclosure can be implemented in a method for wireless communication. The method may include determining a distributed resource unit that comprises a set of tones distributed across a channel bandwidth, the channel bandwidth comprising a greater quantity of tones than an aggregate total number of tones of the set of tones, the set of tones comprising a set of pilot tones and a set of data tones, the set of pilot tones including a plurality of pilot tones, each pilot tone being spaced apart from each other pilot tone by at least one tone, the set of data tones comprising a plurality of distributed groups of data tones, each group of data tones comprising one or more data tones of the set of data tones, each group of data tones being spaced apart from each other group of data tones by at least one tone, communicating data over the set of data tones, and communicating pilot symbols over the set of pilot tones.

Another innovative aspect of the subject matter described in this disclosure can be implemented in a device for wireless communication. The wireless communication device may include at least one modem, at least one processor, at least one memory coupled with the at least one processor, and processor-readable code stored in the memory. The code may be executable by the at least one processor in conjunction with the at least one modem to cause the wireless communication device to determine a distributed resource unit that comprises a set of tones distributed across a channel bandwidth, the channel bandwidth comprising a greater quantity of tones than an aggregate total number of tones of the set of tones, the set of tones comprising a set of pilot tones and a set of data tones, the set of pilot tones including a plurality of pilot tones, each pilot tone being spaced apart from each other pilot tone by at least one tone, the set of data tones comprising a plurality of distributed groups of data tones, each group of data tones comprising one or more data tones of the set of data tones, each group of data tones being spaced apart from each other group of data tones by at least one tone, communicate data over the set of data tones, and communicate pilot symbols over the set of pilot tones.

Another innovative aspect of the subject matter described in this disclosure can be implemented in an apparatus for wireless communication. The apparatus may include means for determining a distributed resource unit that comprises a set of tones distributed across a channel bandwidth, the channel bandwidth comprising a greater quantity of tones than an aggregate total number of tones of the set of tones, the set of tones comprising a set of pilot tones and a set of data tones, the set of pilot tones including a plurality of pilot tones, each pilot tone being spaced apart from each other pilot tone by at least one tone, the set of data tones comprising a plurality of distributed groups of data tones, each group of data tones comprising one or more data tones of the set of data tones, each group of data tones being spaced apart from each other group of data tones by at least one tone, communicating data over the set of data tones, and communicating pilot symbols over the set of pilot tones.

Another innovative aspect of the subject matter described in this disclosure can be implemented in a non-transitory computer-readable medium storing code for wireless communications. The code may include instructions executable by a processor to determine a distributed resource unit that comprises a set of tones distributed across a channel bandwidth, the channel bandwidth comprising a greater quantity of tones than an aggregate total number of tones of the set of tones, the set of tones comprising a set of pilot tones and a set of data tones, the set of pilot tones including a plurality of pilot tones, each pilot tone being spaced apart from each other pilot tone by at least one tone, the set of data tones comprising a plurality of distributed groups of data tones, each group of data tones comprising one or more data tones of the set of data tones, each group of data tones being spaced apart from each other group of data tones by at least one tone, communicate data over the set of data tones, and communicate pilot symbols over the set of pilot tones.

In some examples of the method, device, apparatus, and non-transitory computer-readable medium described herein, determining the distributed RU may include operations, features, means, instructions, or code for determining which tones of the set of tones include the set of data tones, and determining which tones of the set of tones include the set of pilot tones.

In some examples of the method, device, apparatus, and non-transitory computer-readable medium described herein, a subset of the channel bandwidth includes one tone or two tones of the set of tones.

In some examples of the method, device, apparatus, and non-transitory computer-readable medium described herein, the subset of the channel bandwidth includes one megahertz (MHz) of the channel bandwidth.

In some examples of the method, device, apparatus, and non-transitory computer-readable medium described herein, communicating the data may include operations, features, means, instructions, or code for communicating on each data tone of the set of tones at a maximum communication power, and communicating the pilot symbols may include operations, features, means, instructions, or code for communicating on each pilot tone of the set of tones at a maximum communication power.

In some examples of the method, device, apparatus, and non-transitory computer-readable medium described herein, determining the distributed RU may include operations, features, means, instructions, or code for determining the set of tones based on one or more sets of defined tone indices, the one or more sets of defined tone indices associated with determining tone positions for one or more non-distributed resource units.

In some examples of the method, device, apparatus, and non-transitory computer-readable medium described herein, determining the set of tones may include operations, features, means, instructions, or code for shifting the one or more sets of defined tone indices, in which shifting the one or more sets of defined tone indices may include shifting tones associated with the one or more sets of defined tone indices in a frequency domain, and determining the set of data tones and the set of pilot tones based on shifting the one or more sets of defined tone indices.

In some examples of the method, device, apparatus, and non-transitory computer-readable medium described herein, each group of data tones may consist of a pair of contiguous tones.

BRIEF DESCRIPTION OF THE DRAWINGS

Details of one or more implementations of the subject matter described in this disclosure are set forth in the accompanying drawings and the description below. Other features, aspects, and advantages will become apparent from the description, the drawings and the claims. Note that the relative dimensions of the following figures may not be drawn to scale.

DETAILED DESCRIPTION

Figure 1:
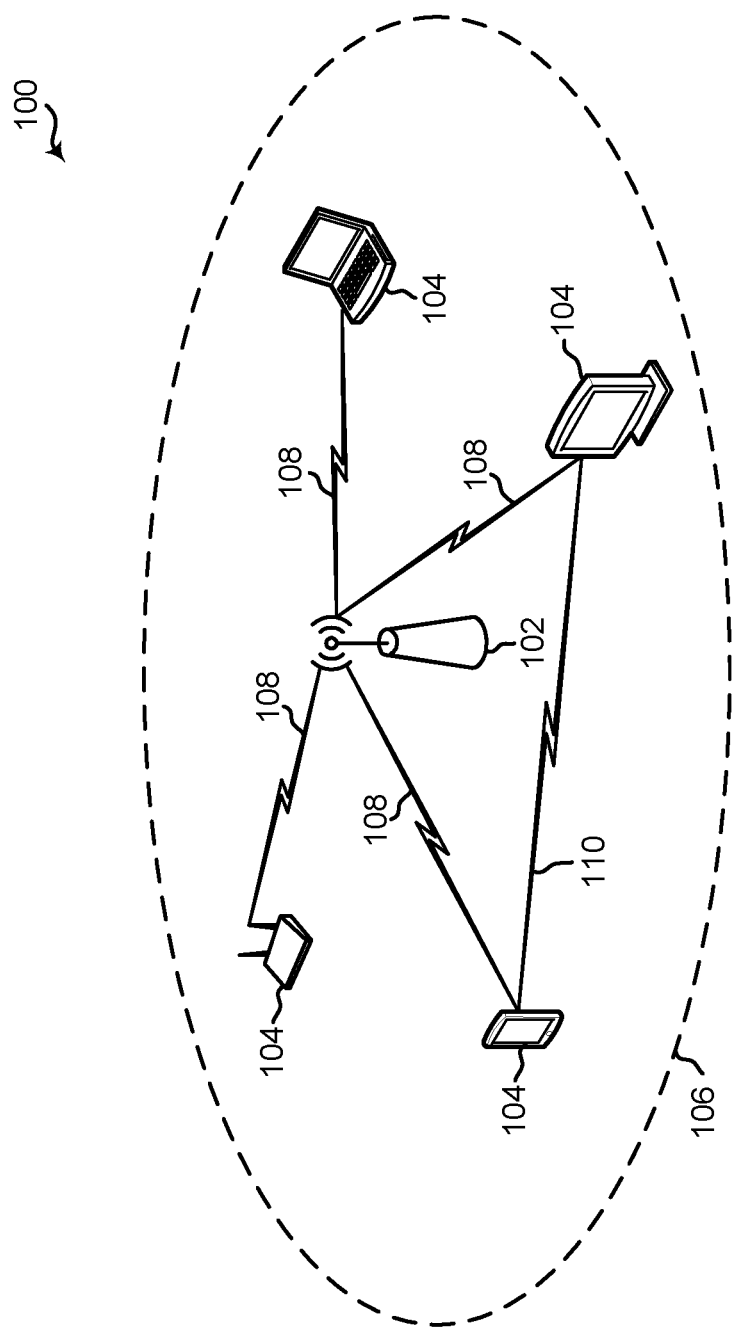
FIG. 1 shows a pictorial diagram of an example wireless communication network.

The following description is directed to certain implementations for the purposes of describing innovative aspects of this disclosure. However, a person having ordinary skill in the art will readily recognize that the teachings herein can be applied in a multitude of different ways. The described implementations can be implemented in any device, system or network that is capable of transmitting and receiving radio frequency (RF) signals according to one or more of the Institute of Electrical and Electronics Engineers (IEEE)

802.11 standards, the IEEE 802.15 standards, the Bluetooth® standards as defined by the Bluetooth Special Interest Group (SIG), or the Long Term Evolution (LTE), 3G, 4G or 5G (New Radio (NR)) standards promulgated by the 3rd Generation Partnership Project (3GPP), among others. The described implementations can be implemented in any device, system or network that is capable of transmitting and receiving RF signals according to one or more of the following technologies or techniques: code division multiple access (CDMA), time division multiple access (TDMA), frequency division multiple access (FDMA), orthogonal FDMA (OFDMA), single-carrier FDMA (SC-FDMA), single-user (SU) multiple-input multiple-output (MIMO) and multi-user (MU) MIMO. The described implementations also can be implemented using other wireless communication protocols or RF signals suitable for use in one or more of a wireless personal area network (WPAN), a wireless local area network (WLAN), a wireless wide area network (WWAN), or an internet of things (IOT) network.

Some wireless communications systems (for example, Wi-Fi or WLAN systems) may support allocating multiple resource units (RUs) over a channel bandwidth. For example, an access point (AP) may allocate each of multiple RUs to one or more respective stations (STAs). For example, the AP may transmit a downlink (DL) OFDMA communication that includes multiple RUs each addressed to a respective STA. Similarly, the AP may transmit scheduling information to multiple STAs that indicates an RU allocation. The RU allocation may indicate which RU each of the STAs is to use to transmit an uplink (UL) OFDMA communication to the AP. Each of the RUs includes a fixed number of tones or subcarriers. Most of the tones are used to carry data in a data communication, but some of the tones ("pilot tones") are used to carry pilot symbols. Pilot signals may be transmitted with the data to improve reception and reliability of the data.

The configurations of some RUs (for example, the locations of the allocated data and pilot tones in each RU) may not efficiently utilize the available transmit power of the transmitting device. For example, a device may reduce power when communicating via one or more RUs, such as based on a power spectral density (PSD) limit for a communication bandwidth including the one or more RUs. In some implementations, a channel bandwidth may have a transmit power constraint (such as a regulatory constraint or a capability constraint) for communications in terms of PSD (for example, in a PSD-limited domain). For example, there may be a PSD limit of 11 decibel-milliwatts (dBm) of each megahertz (MHz) for a specific bandwidth, which may result in a total PSD limit of 14 dBm for an RU (for example, a small RU, such as an RU that includes 26 tones). Communications over some RUs may therefore be reduced in transmit power to remain within the PSD limit. Additionally or alternatively, a channel bandwidth may be subject to constraints in available frequency ranges, and improved techniques are generally desired.

Various aspects relate generally to RU allocation, and specifically, to configuring a distributed RU having a set of tones that are distributed across a channel bandwidth. As such, while an aggregate quantity of tones of the set of tones of the distributed RU is less than the total quantity of tones of the channel bandwidth, the set of tones of the distributed RU may be distributed outside of the normal bounds of a conventional RU throughout various portions of the channel bandwidth. The set of tones of the distributed RU may include a set of data tones and a set of pilot tones. In some examples, at least some of the set of data tones (for example, all or most of the data tones) may be arranged into distributed groups of tones (for example, groups of one or more tones). In some examples, each of the set of pilot tones may be located a defined distance from one another and from neighboring data tones of the set of data tones of the distributed RU. As an example, the pilot tones may be separated from each other and from adjacent data tones by a particular quantity of tones (for example, a minimum quantity of tones or a quantity of tones below a threshold).

In some examples, a distributed RU including 26 tones (for example, 24 data tones and 2 pilot tones) may be distributed across a channel bandwidth spanning 242 tones (such as by spreading data tones across 216 useful tones of the total 242 tones). 24 data tones may be spread and mapped to 12 groups of 2 data tones each, and pilot tones may be mapped to other available tones. For example, the data tones may be mapped to groups of contiguous tones (for example, one or more contiguous tones), and the pilot tones may be mapped to tones near edges of the channel bandwidth or near a direct current (DC) in a center of the bandwidth. The allocation of the pilot tones may support a defined spacing between groups of data tones and pilot tones (for example, at least 11 tones or at least 15 tones). In some implementations, the tones of an RU may be based on one or more defined sets of tone indices, and in some implementations, the one or more defined sets of tone indices may be shifted and used to define the tones of the distributed RU.

One or more channel bandwidths including one or more distributed RUs may be multiplexed within a system bandwidth. As an example, the system bandwidth may include channel bandwidths associated with distributed RUs (for example, the system bandwidth may include channel bandwidths dedicated to distributed RUs). In another example, a system bandwidth may include a quantity of channel bandwidths (for example, one or two channel bandwidths) for distributed RUs, while the rest of the system bandwidth may be unassociated with distributed RUs (for example, may be associated with RUs that are large or not PSD-limited).

Particular implementations of the subject matter described in this disclosure can be implemented to realize one or more of the following potential advantages. In some implementations, the described techniques can be used to efficiently utilize a given channel bandwidth. For example, tones of an RU may be distributed across the channel bandwidth to improve frequency diversity for the RU, such as by increasing a frequency range associated with the tones of the RU. The distribution of the tones across the channel bandwidth may also enable an increased available power for transmissions, for example, by meeting a PSD limit for the channel bandwidth and increasing transmit power based on distributing the tones.

Aspects of the disclosure are initially described in the context of wireless communications systems. Additional aspects are described with respect to a channel bandwidth configuration, system bandwidth configurations, tone mapping configurations, and a timing diagram. Aspects of the disclosure are further illustrated by and described with reference to apparatus diagrams, system diagrams, and flowcharts that relate to a configuration for distributed RUs.

FIG. 1 shows a pictorial diagram of an example wireless communication network 100. According to some aspects, the wireless communication network 100 can be an example of a wireless local area network (WLAN) such as a Wi-Fi network (and will hereinafter be referred to as WLAN 100). For example, the WLAN 100 can be a network implementing at least one of the IEEE 802.11 family of standards (such as that defined by the IEEE 802.11-2016 specification or amendments thereof including, but not limited to, 802.11ah, 802.11ad, 802.11ay, 802.11ax, 802.11az, 802.11ba and 802.11be). The WLAN 100 may include numerous wireless communication devices such as an access point (AP) 102 and multiple stations (STAs) 104. Although only one AP 102 is shown, the WLAN network 100 also can include multiple APs 102.

Each of the STAs 104 also may be referred to as a mobile station (MS), a mobile device, a mobile handset, a wireless handset, an access terminal (AT), a user equipment (UE), a subscriber station (SS), or a subscriber unit, among other possibilities. The STAs 104 may represent various devices such as mobile phones, personal digital assistant (PDAs), other handheld devices, netbooks, notebook computers, tablet computers, laptops, display devices (for example, TVs, computer monitors, navigation systems, among others), music or other audio or stereo devices, remote control devices ("remotes"), printers, kitchen or other household appliances, key fobs (for example, for passive keyless entry and start (PKES) systems), among other possibilities.

A single AP 102 and an associated set of STAs 104 may be referred to as a basic service set (BSS), which is managed by the respective AP 102. FIG. 1 additionally shows an example coverage area 106 of the AP 102, which may represent a basic service area (BSA) of the WLAN 100. The BSS may be identified to users by a service set identifier (SSID), as well as to other devices by a basic service set identifier (BSSID), which may be a media access control (MAC) address of the AP 102. The AP 102 periodically broadcasts beacon frames ("beacons") including the BSSID to enable any STAs 104 within wireless range of the AP 102 to "associate" or re-associate with the AP 102 to establish a respective communication link 108 (hereinafter also referred to as a "Wi-Fi link"), or to maintain a communication link 108, with the AP 102. For example, the beacons can include an identification of a primary channel used by the respective AP 102 as well as a timing synchronization function for establishing or maintaining timing synchronization with the AP 102. The AP 102 may provide access to external networks to various STAs 104 in the WLAN via respective communication links 108.

To establish a communication link 108 with an AP 102, each of the STAs 104 is configured to perform passive or active scanning operations ("scans") on frequency channels in one or more frequency bands (for example, the 2.4 GHz, 5 GHz, 6 GHz or 60 GHz bands). To perform passive scanning, a STA 104 listens for beacons, which are transmitted by respective APs 102 at a periodic time interval referred to as the target beacon transmission time (TBTT) (measured in time units (TUs) in which one TU may be equal to 1024 microseconds (µs)). To perform active scanning, a STA 104 generates and sequentially transmits probe requests on each channel to be scanned and listens for probe responses from APs 102. Each STA 104 may be configured to identify or select an AP 102 with which to associate based on the scanning information obtained through the passive or active scans, and to perform authentication and association operations to establish a communication link 108 with the selected AP 102. The AP 102 assigns an association identifier (AID) to the STA 104 at the culmination of the association operations, which the AP 102 uses to track the STA 104.

As a result of the increasing ubiquity of wireless networks, a STA 104 may have the opportunity to select one of many BSSs within range of the STA or to select among multiple APs 102 that together form an extended service set (ESS) including multiple connected BSSs. An extended network station associated with the WLAN 100 may be connected to a wired or wireless distribution system that may allow multiple APs 102 to be connected in such an ESS. As such, a STA 104 can be covered by more than one AP 102 and can associate with different APs 102 at different times for different transmissions. Additionally, after association with an AP 102, a STA 104 also may be configured to periodically scan its surroundings to find a more suitable AP 102 with which to associate. For example, a STA 104 that is moving relative to its associated AP 102 may perform a "roaming" scan to find another AP 102 having more desirable network characteristics such as a greater received signal strength indicator (RSSI) or a reduced traffic load.

In some implementations, STAs 104 may form networks without APs 102 or other equipment other than the STAs 104 themselves. One example of such a network is an ad hoc network (or wireless ad hoc network). Ad hoc networks may alternatively be referred to as mesh networks or peer-to-peer (P2P) networks. In some implementations, ad hoc networks may be implemented within a larger wireless network such as the WLAN 100. In such implementations, although the STAs 104 may be capable of communicating with each other through the AP 102 using communication links 108, STAs 104 also can communicate directly with each other via direct wireless communication links 110. Additionally, two STAs 104 may communicate via a direct wireless communication link 110 regardless of whether both STAs 104 are associated with and served by the same AP 102. In such an ad hoc system, one or more of the STAs 104 may assume the role filled by the AP 102 in a BSS. Such a STA 104 may be referred to as a group owner (GO) and may coordinate transmissions within the ad hoc network. Examples of direct wireless communication links 110 include Wi-Fi Direct connections, connections established by using a Wi-Fi Tunneled Direct Link Setup (TDLS) link, and other P2P group connections.

The APs 102 and STAs 104 may function and communicate (via the respective communication links 108) according to the IEEE 802.11 family of standards (such as that defined by the IEEE 802.11-2016 specification or amendments thereof including, but not limited to, 802.11ah, 802.11ad, 802.11ay, 802.11ax, 802.11az, 802.11ba and 802.11be). These standards define the WLAN radio and baseband protocols for the physical (PHY) and MAC layers. The APs 102 and STAs 104 transmit and receive wireless communications (hereinafter also referred to as "Wi-Fi communications") to and from one another in the form of physical layer convergence protocol (PLCP) protocol data units (PPDUs). The APs 102 and STAs 104 in the WLAN 100 may transmit PPDUs over an unlicensed spectrum, which may be a portion of spectrum that includes frequency bands traditionally used by Wi-Fi technology, such as the 2.4 GHz band, the 5 GHz band, the 60 GHz band, the 3.6 GHz band, and the 900 MHz band. Some implementations of the APs 102 and STAs 104 described herein also may communicate in other frequency bands, such as the 6 GHz band, which may support both licensed and unlicensed communications. The APs 102 and STAs 104 also can be configured to communicate over other frequency bands such as shared licensed frequency bands, in which multiple operators may have a license to operate in the same or overlapping frequency band or bands.

Each of the frequency bands may include multiple sub-bands or frequency channels. For example, PPDUs conforming to the IEEE 802.11n, 802.11ac and 802.11ax standard amendments may be transmitted over the 2.4 and 5 GHz bands, each of which is divided into multiple 20 MHz channels. As such, these PPDUs are transmitted over a physical channel having a minimum bandwidth of 20 MHz, but larger channels can be formed through channel bonding. For example, PPDUs may be transmitted over physical channels having bandwidths of 40 MHz, 80 MHz, 160 or 320 MHz by bonding together multiple 20 MHz channels.

Each PPDU is a composite structure that includes a PHY preamble and a payload in the form of a PLCP service data unit (PSDU). The information provided in the preamble may be used by a receiving device to decode the subsequent data in the PSDU. In instances in which PPDUs are transmitted over a bonded channel, the preamble fields may be duplicated and transmitted in each of the multiple component channels. The PHY preamble may include both a legacy portion (or "legacy preamble") and a non-legacy portion (or "non-legacy preamble"). The legacy preamble may be used for packet detection, automatic gain control and channel estimation, among other uses. The legacy preamble also may generally be used to maintain compatibility with legacy devices. The format of, coding of, and information provided in the non-legacy portion of the preamble is based on the particular IEEE 802.11 protocol to be used to transmit the payload.

As described above, the APs 102 and the STAs 104 can support multi-user (MU) communications; that is, concurrent transmissions from one device to each of multiple devices (for example, multiple simultaneous downlink (DL) communications from an AP 102 to corresponding STAs 104), or concurrent transmissions from multiple devices to a single device (for example, multiple simultaneous uplink (UL) transmissions from corresponding STAs 104 to an AP 102). To support the MU transmissions, the APs 102 and STAs 104 may utilize multi-user multiple-input, multiple-output (MU-MIMO) and multi-user orthogonal frequency division multiple access (MU-OFDMA) techniques.

In MU-OFDMA schemes, the available frequency spectrum of the wireless channel may be divided into multiple RUs each including a quantity of different frequency sub-carriers ("tones"). Different RUs may be allocated or assigned by an AP 102 to different STAs 104 at particular times. The sizes and distributions of the RUs may be referred to as an RU allocation. In some implementations, RUs may be allocated in 2 MHz intervals, and as such, the smallest RU may include 26 tones consisting of 24 data tones and 2 pilot tones. Consequently, in a 20 MHz channel, up to 9 RUs (such as 2 MHz, 26-tone RUs) may be allocated (because some tones are reserved for other purposes). Similarly, in a 160 MHz channel, up to 74 RUs may be allocated. Larger 52 tone, 106 tone, 242 tone, 484 tone and 996 tone RUs may also be allocated. Contiguous RUs may be separated by a null subcarrier (such as a DC subcarrier), for example, to reduce interference between contiguous RUs, to reduce receiver DC offset, and to avoid transmit center frequency leakage.

For UL MU transmissions, an AP 102 can transmit a trigger frame to initiate and synchronize an UL MU-OFDMA or UL MU-MIMO transmission from multiple STAs 104 to the AP 102. Such trigger frames may thus enable multiple STAs 104 to send UL traffic to the AP 102 concurrently in time. A trigger frame may address one or more STAs 104 through respective association identifiers (AIDs), and may assign each AID (and thus each STA 104) one or more RUs that can be used to send UL traffic to the AP 102. The AP also may designate one or more random access (RA) RUs that unscheduled STAs 104 may contend for.

RUs in a channel bandwidth may be assigned to devices for communication. For example, an AP 102 may allocate one or more of the RUs to a STA 104 for communication. The STA 104 may receive downlink data over the allocated RU or may transmit uplink data over the allocated RU. Pilot signals may be transmitted with the data to improve reception reliability of the data. The wireless communication network 100 may support different RU and bandwidth sizes. For example, the wireless communication network 100 may support distributed RUs for RUs including 26 tones, 52 tones, 106 tones, among other examples, and may support channel bandwidths spanning 20 MHz, 40 MHz, 80 MHz, 160 MHz, or 320 MHz, among other examples. In some implementations, larger RUs may be constructed using smaller RUs as building blocks. For example, the tones allocated for an RU including 52 tones may correspond to the physical tones for two logic RUs with 26 tones.

To efficiently utilize a given bandwidth, an AP 102 may distribute the RUs across the channel bandwidth to improve frequency diversity and available power for communications. For example, each RU may be distributed over a wider bandwidth, and the majority of tones for each RU may be mapped to distributed groups of contiguous tones in the bandwidth (for example, groups of one or more contiguous tones). In some examples, a logic RU including 26 tones (for example, 24 data tones and 2 pilot tones) may be distributed across a channel bandwidth spanning 242 tones (for example, the 24 data tones may be spread out across 216 useful tones of the total 242 tones). The 24 data tones may be spread and mapped to 12 sets of data tones, and the pilot tones may be mapped to other available tones.

In some implementations, the data tones may be mapped to sets of contiguous tones, for example, groups of one or more contiguous tones, and the pilot tones may be mapped to tones near the edges of the channel bandwidth or near a DC in the center of the channel bandwidth. The allocation of the pilot tones may support a defined spacing between groups of data tones and pilot tones (for example, at least 11 or 15 tones). One or more channel bandwidths including one or more distributed RUs may also be multiplexed with other channel bandwidths (for example, channel bandwidths unassociated with distributed RUs) within a system bandwidth.

Figure 2:
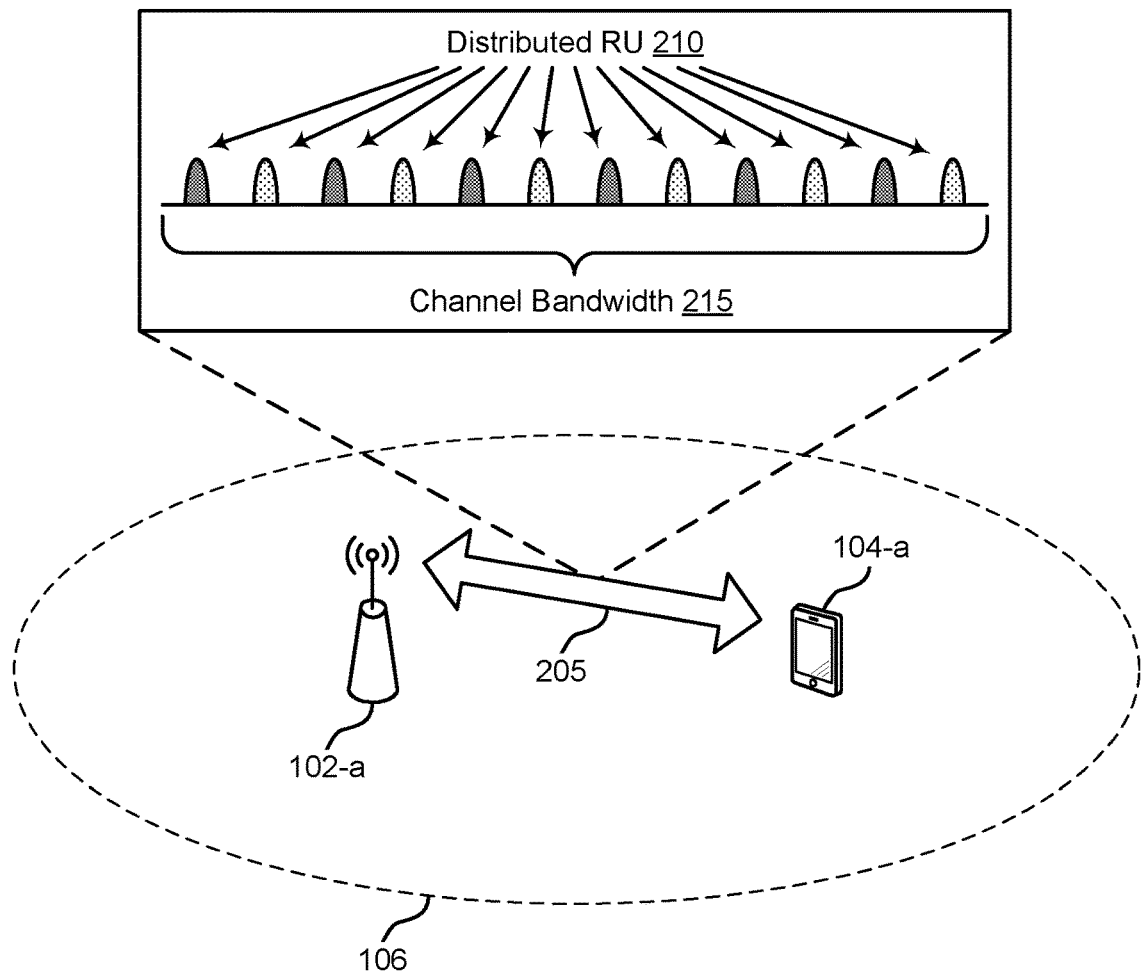
FIG. 2 shows a pictorial diagram of an example wireless communication network.

FIG. 2 shows a pictorial diagram of an example wireless communication network 200. The wireless communication network 200 may be an example of a wireless communication network 100 and may include an AP 102-a and a STA 104-a, which may be examples of the corresponding devices described with reference to FIG. 1. The AP 102-a may provide network coverage for a coverage area 106. The AP 102-a and the STA 104-a may communicate over a communication link 205 (for example, transmitting data or pilot signals on the uplink or the downlink). The AP 102-a and the STA 104-a may utilize one or more distributed RUs 210 to improve frequency diversity gain and to obtain a power advantage for communications.

The wireless communication network 200 (for example, a Wi-Fi system or WLAN) may use logical RUs as building blocks for a distributed RU 210. In some implementations, each of the logical RUs may span or include 26 tones (subcarriers) and may be referred to as a logic RU26. A transmitting device (for example, the AP 102-a or the STA 104-a) may spread the tones of a logic RU over a specific bandwidth to obtain a power advantage for the transmission (for example, to increase the transmit power while maintaining a PSD limitation). In this way, while the logic RU may correspond to a narrowband, the logic RU may be spread over a wider frequency domain. For example, the AP 102-a may distribute the tones for the distributed RU 210 across a channel bandwidth 215. In some examples, an aggregate bandwidth (for example, in terms of a quantity of tones) for the tones may be less than a quantity of tones associated with the channel bandwidth 215.

In some examples, a device (such as the AP 102-a or the STA 104-a) may transmit over the distributed RU 210 with a maximum transmit power or peak power, while still remaining below a PSD limit for the network. In some examples, to transmit using the peak power while transmitting under the PSD limit, a device may spread the transmission over a bandwidth size of approximately 20 MHz (for example, with a peak power of 24 dBm and a PSD limit of 11 dBm for each 1 MHz). This peak power, PSD limit, and bandwidth are given as examples, and other values may be used for a distributed RU 210.

In some implementations, an AP 102 (such as AP 102-a), may use or allocate to a STA 104 (such as STA 104-a), a distributed RU 210 having a size greater than the logic RU size (for example, greater than RU26). In some implementations, the size of the distributed RU 210 may be greater than a threshold RU size (for example, greater than an RU106). Additionally, or alternatively, the transmitting device may map the distributed RU 210 over a channel bandwidth 215 greater than the bandwidth supporting the full power advantage (for example, greater than 20 MHz). The distribution of the tones in the distributed RU 210 may obtain a frequency diversity gain and a transmit power advantage. These advantages may be relatively greater for uplink transmissions (for example, data or pilot transmissions from the STA 104-a to the AP 102-a) because a device transmitting on the uplink (such as the STA 104-a) may experience more transmit power limitations than a device transmitting on the downlink (such as the AP 102-a).

The following examples illustrate two possible distributed RU 210 designs utilizing tone sets 220 for distribution across a channel bandwidth 215. The description focuses on an RU26 including 24 data tones and 2 pilot tones spread over a distributed RU 210 having 242 tones (an "RU242"), for example, for a channel bandwidth 215 of 20 MHz. Other distributed RUs 210, channel bandwidths 215, and distribution designs are possible and supported by wireless communication network 200. For example, distribution designs and configurations for a distributed RU 210 having 52 tones or 106 tones (an "RU52" or an "RU106," respectively) are described herein with reference to FIG. 4. Other distribution designs and configurations for a distributed RU 210 having different quantities of tones also fall within the scope of this disclosure.

The distributed RU 210 may include a set of tones (a tone set 220) with an aggregate bandwidth (for example, 26 tones) that is less than a quantity of tones corresponding to the channel bandwidth 215 (for example, 242 tones). The tone set 220 may be mapped to tones within the channel bandwidth 215 and may include a subset of data tones that may be mapped to distributed groups of one or more contiguous tones over the channel bandwidth 215. For example, the channel bandwidth 215 may include groups of data tones with two tones in each group, and each distributed RU 210 may include a quantity of these groups.

Additionally, the set of tones may include a subset of pilot tones. The pilot tones may be non-contiguous or may be separated by at least a threshold quantity of tones. At least two pilot tones for the distributed RU 210 may be mapped to tones sufficiently far apart in the channel bandwidth 215 to improve the frequency diversity for channel estimation and other procedures. In some examples, the groups of data tones and pilot tones of the distributed RU 210 may be separated from other tones of the distributed RU 210 by a quantity of tones (for example, at least 11 tones or at least 15 tones, among other examples) to obtain a power advantage and remain within a PSD limit.

In a first implementation, a distribution design for the distributed RU 210 may utilize the tone sets 220. In some examples, the tone sets 220 may correspond to tone sets 220 (such as a set of tone indices) for null data packet (NDP) short feedback (see Table 1).

TABLE 1

Example Tone Sets for an RU Distribution

| Tone Set | b = 1 | b = 0 |
|---|---|---|
| 1 | −113, −77, −41, 6, 42, 78 | −112, −76, −40, 7, 43, 79 |
| 2 | −111, −75, −39, 8, 44, 80 | −110, −74, −38, 9, 45, 81 |
| 3 | −109, −73, −37, 10, 46, 82 | −108, −72, −36, 11, 47, 83 |
| 4 | −107, −71, −35, 12, 48, 84 | −106, −70, −34, 13, 49, 85 |
| 5 | −105, −69, −33, 14, 50, 86 | −104, −68, −32, 15, 51, 87 |
| 6 | −103, −67, −31, 16, 52, 88 | −102, −66, −30, 17, 53, 89 |
| 7 | −101, −65, −29, 18, 54, 90 | −100, −64, −28, 19, 55, 91 |
| 8 | −99, −63, −27, 20, 56, 92 | −98, −62, −26, 21, 57, 93 |
| 9 | −97, −61, −25, 22, 58, 94 | −96, −60, −24, 23, 59, 95 |
| 10 | −95, −59, −23, 24, 60, 96 | −94, −58, −22, 25, 61, 97 |
| 11 | −93, −57, −21, 26, 62, 98 | −92, −56, −20, 27, 63, 99 |
| 12 | −91, −55, −19, 28, 64, 100 | −90, −54, −18, 29, 65, 101 |
| 13 | −89, −53, −17, 30, 66, 102 | −88, −52, −16, 31, 67, 103 |
| 14 | −87, −51, −15, 32, 68, 104 | −86, −50, −14, 33, 69, 105 |
| 15 | −85, −49, −13, 34, 70, 106 | −84, −48, −12, 35, 71, 107 |
| 16 | −83, −47, −11, 36, 72, 108 | −82, −46, −10, 37, 73, 109 |
| 17 | −81, −45, −9, 38, 74, 110 | −80, −44, −8, 39, 75, 111 |
| 18 | −79, −43, −7, 40, 76, 112 | −78, −42, −6, 41, 77, 113 |

In the first implementation, the channel bandwidth 215 may span RU242 and a distributed RU configuration may be configured using one or more of 18 tone sets 220. In some examples, each tone set 220 may include 12 distributed tones. The tone indices supporting the data tones may include [−113:−6, 6:113], and a bandwidth spanning 242 tones may therefore include 216 useful tones from which the data tones may be selected for the distributed RU 210. Each tone set 220 may include 12 tones, such that two tone sets 220 may include 24 data tones for one distributed RU 210 (for example, a logic RU26). This configuration may allow the system to support nine logic RU26s distributed in the channel bandwidth 215.

For example, with reference to Table 1, the system may support a first RU26 including the tones associated with tone sets 1 and 10, a second RU26 including the tones associated with tone sets 2 and 11, among other examples, up to a ninth RU26 including the tones associated with tone sets 9 and 18. For example, the AP 102-a or the STA 104-a may transmit over data tones for an RU26 corresponding to tone sets 220-a and 220-b, which may be examples of two tone sets as described with reference to Table 1. In some examples, if a tone set 220-a corresponds to tone set 1 of Table 1, and a tone set 220-b corresponds to tone set 10 of Table 1, the AP 102-a or the STA 104-a may communicate data over 24 data tones with tone indices −113, −112, −95, −94, −77, −76, −59, −58, −41, −40, −23, −22, 6, 7, 24, 25, 42, 43, 60, 61, 78, 79, 96, and 97. These 24 data tones are made up of 12 groups of one or more contiguous tones over the channel bandwidth 215.

A transmitting device (such as the AP 102-a or the STA 104-a) may additionally transmit pilot signals in multiple pilot tones of the distributed RU 210. The pilot tones may be allocated to available tones in the channel bandwidth 215 (for example, tones not occupied by data tones for any of the tone sets 220). The pilot tones may be mapped towards edges of the channel bandwidth 215, towards a center of the channel bandwidth 215, or may be spaced between the two, or a combination thereof. In some implementations, the locations for the pilot tones may be based on a quantity of extra edge tones or DC tones. For example, to maintain a reservation of seven DC tones for OFDMA in the center of the channel bandwidth 215 (for example, DC tones [−3:3]), pilot tones (for example, 18 pilot tones, two each for 9 RU26s) may be allocated such that pilot tone indices may include [−122:−114, −5:−4, 4:5, 114:122]. Such allocation may leave some unallocated tones on each edge of the channel bandwidth 215, which may be used for interference cancelation. For example, a channel bandwidth 215 may include 6 edge tones on the one side of the channel bandwidth 215 and 5 edge tones on the opposing side.

Some examples of a specific pilot tone allocation rule may involve sequentially allocating one pilot to a negative tone index and one pilot to a positive tone index to form a set of two pilot tones for a distributed RU 210 (such as an RU26). For example, if the pilot tone portion of the channel bandwidth 215 spans tone indices [−122:−114, −5:−4, 4:5, 114: 122], a first set of two pilot tones may include pilot tone index −5 and pilot tone index 116. Using such a rule, the two pilot tones for a logic RU26 may be sufficiently far apart to harvest frequency diversity for pilot signals. Using this pilot tone allocation rule and the tone set 220 allocation design described above, the channel bandwidth 215 may support nine logic RU26s as defined in Table 2:

TABLE 2

Example Tone Distribution for Logic RU26

Physical Tone Indices/Tone Sets belonging to corresponding logic RU26

| Logic RU26 Index | 1 | 2 | 3 | 4 | 5 | 6 | 7 | 8 | 9 |
|---|---|---|---|---|---|---|---|---|---|
| Data Tones (Tone Sets) | 1, 10 | 2, 11 | 3, 12 | 4, 13 | 5, 14 | 6, 15 | 7, 16 | 8, 17 | 9, 18 |
| Pilot Tones (Tone Indices) | −5, 116 | −4, 117 | −122, 118 | −121, 119 | −120, 120 | −119, 121 | −118, 122 | −117, 4 | −116, 5 |

Although Table 2 shows one possible data and pilot tone allocation for RU distribution, other allocations for a distributed RU 210 are possible.

Additionally or alternatively, a distribution design for RUs may utilize shifted tone sets 220. In some examples, the shifted tone sets 220 may be a shifted version of the sets of tone indices for NDP short feedback as described with reference to Table 1. For example, the tone sets described with reference to Table 1 may be shifted to the upwards in the spectrum ("right"), downwards in the spectrum ("left"), or both, by a quantity of tones (for example, two or more tones). As an example, tones with negative indices may be shifted to the left by two or more tones, and tones with positive indices may be shifted to the right by two or more tones (see Table 3).

TABLE 3

Example Shifted Tone Sets for RU Distribution

| Tone Sets | b = 1 | b = 0 |
|---|---|---|
| 1 | −115, −79, −43, 8, 44, 80 | −114, −78, −42, 9, 45, 81 |
| 2 | −113, −77, −41, 10, 46, 82 | −112, −76, −40, 11, 47, 83 |
| 3 | −111, −75, −39, 12, 48, 84 | −110, −74, −38, 13, 49, 85 |
| 4 | −109, −73, −37, 14, 50, 86 | −108, −72, −36, 15, 51, 87 |

TABLE 3-continued

Example Shifted Tone Sets for RU Distribution

| Tone Sets | b = 1 | b = 0 |
|---|---|---|
| 5 | −107, −71, −35, 16, 52, 88 | −106, −70, −34, 17, 53, 89 |
| 6 | −105, −69, −33, 18, 54, 90 | −104, −68, −32, 19, 55, 91 |
| 7 | −103, −67, −31, 20, 56, 92 | −102, −66, −30, 21, 57, 93 |
| 8 | −101, −65, −29, 22, 58, 94 | −100, −64, −28, 23, 59, 95 |
| 9 | −99, −63, −27, 24, 60, 96 | −98, −62, −26, 25, 61, 97 |
| 10 | −97, −61, −25, 26, 62, 98 | −96, −60, −24, 27, 63, 99 |
| 11 | −95, −59, −23, 28, 64, 100 | −94, −58, −22, 29, 65, 101 |
| 12 | −93, −57, −21, 30, 66, 102 | −92, −56, −20, 31, 67, 103 |
| 13 | −91, −55, −19, 32, 68, 104 | −90, −54, −18, 33, 69, 105 |
| 14 | −89, −53, −17, 34, 70, 106 | −88, −52, −16, 35, 71, 107 |
| 15 | −87, −51, −15, 36, 72, 108 | −86, −50, −14, 37, 73, 109 |
| 16 | −85, −49, −13, 38, 74, 110 | −84, −48, −12, 39, 75, 111 |
| 17 | −83, −47, −11, 40, 76, 112 | −82, −46, −10, 41, 77, 113 |
| 18 | −81, −45, −9, 42, 78, 114 | −80, −44, −8, 43, 79, 115 |

A channel bandwidth 215 spanning RU242 may be configured using one or more of 18 shifted tone sets 220. In some examples, each shifted tone set 220 may include 12 distributed tones, in a same manner as described with reference to the non-shifted tone sets 220. For example, based on the shifted tone sets 220 presented in Table 3, useful data tone indices may include [−115:−8, 8:115] and a bandwidth spanning 242 tones may include 216 tones for data. A device may use the two shifted tone sets 220 to form 24 data tones for one distributed RU 210 (for example, an RU26), as described with reference to the non-shifted tone sets 220. For example, if the tone set 220-a corresponds to tone set 1 of Table 3, and the tone set 220-b corresponds to tone set 10 of Table 3, the AP 102-a or the STA 104-a may transmit data in 24 data tones with shifted tone indices −115, −114, −97, −96, −79, −78, −61, −60, −43, −42, −25, −24, 8, 9, 26, 27, 44, 45, 62, 63, 80, 81, 98, and 99.

Shifting the tone sets 220 may result in a wider range of useful pilot tones. For example, according to the shifted tone sets 220 presented in Table 3, useful pilot tone indices may include [−122:−116, −7:−4, 4:7, 116:122]. These shifted pilot tone indices may reserve a quantity of DC tones in the center of the channel bandwidth 215 and a quantity of unallocated edge tones (for example, for interference cancellation) at the edges of the channel bandwidth 215. The shifted tones may leave 6 edge tones along the lower edge of the channel bandwidth 215 and 5 edge tones along the upper edge. The wider range of the shifted pilot tone indices may support a larger quantity of tones between pilot tones and groups of data tones in the distributed RU 210. For example, at least 15 tones may separate the pilot tones from other pilot tones or from a nearest group of data tones.

A pilot tone allocation rule may be applied to the shifted tone sets 220, in a similar manner as described with reference to the non-shifted tone sets 220. For example, the rule may involve sequentially allocating one pilot to a negative tone index and one pilot to a positive tone index to form a set of two pilot tones for a distributed RU 210 (such as an RU26). For example, if the shifted pilot portion of the channel bandwidth 215 spans [−122:−116, −7:−4, 4:7, 116:122], a first set of pilot tones may include pilot tone index −7 and pilot tone index 118. Using such a rule, the two pilot tones for a logic RU26 may be sufficiently far apart to harvest frequency gain for pilot signals. Using this pilot tone allocation rule and the shifted tone set 220 allocation design described above, the channel bandwidth 215 may support nine logic RU26s as defined in Table 4:

TABLE 4

Example Shifted Tone Plan Distribution for Logic RU26

| | Physical Tone Indices/Tone Sets belonging to corresponding logic RU26 | | | | | | | | |
|---|---|---|---|---|---|---|---|---|---|
| Logic RU26 Index | 1 | 2 | 3 | 4 | 5 | 6 | 7 | 8 | 9 |
| Data Tones (Tone Sets) | 1, 10 | 2, 11 | 3, 12 | 4, 13 | 5, 14 | 6, 15 | 7, 16 | 8, 17 | 9, 18 |
| Pilot Tones (Tone Indices) | −7, 118 | −6, 119 | −5, 120 | −4, 121 | −122, 122 | −121, 4 | −120, 5 | −119, 6 | −118, 7 |

The tables herein show possible data and pilot tone allocations for RU26 distribution. Many other tone allocations are possible, and each tone allocation may distribute a set of tones across a channel bandwidth 215 that includes a greater amount of tones than an aggregate bandwidth of the set of tones, in which a majority of the set of tones (for example, the subset of data tones) are allocated to distributed groups of one or more contiguous tones.

Additionally, or alternatively, the distributed RU 210 may be based on other factors. For example, a type of data or format of the data to be transmitted in the distributed RU 210 may determine the allocation of tones or the data tone mapping for the distributed RU 210. Uncompressed long training fields (LTFs) such as 4×LTFs may be used to transmit data in each pilot tone and in each data tone of the sets of data tones. Compressed LTFs (for example, LTFs with a tone group factor, Ng, greater than 1, such as 1× or 2×LTFs) may transmit one value over a set of tones. For example, 2×LTF may transmit one value over a set of two tones (such as by using one tone of the set of two tones). In these cases, a transmitting device may support 2×LTF by transmitting one data tone in each group of contiguous data tones. The transmitting device may additionally transmit pilot signals on all distributed pilot tones. In other cases, the devices may not use compressed LTFs, and may transmit uncompressed 4×LTFs. In some examples, for short training fields (STFs), the APs 102 and STAs 104 of the wireless communication network 200 may implement an existing 20 MHz STF for each 20 MHz channel bandwidth 215 in OFDMA.

In some implementations, allocated resources for distributed RUs 210 in the channel bandwidth 215 may include resources interleaved, for example, using existing interleaving methods for non-distributed transmissions. However, in other cases, the distribution procedure may provide sufficient frequency diversity to the transmissions, and interleaving may not be performed. Additionally, or alternatively, the logic RUs distributed within the channel bandwidth 215 may have different sizes (such as an RU52 or an RU106). A device may unify tone mapping over the channel bandwidth 215 (for example, including pilot tones) with the mixed RU sizes.

One or more channel bandwidths 215 including one or more distributed RUs 210 may be multiplexed within a system bandwidth. As an example, the system bandwidth may be configured to include channel bandwidths 215 associated with the distributed RUs 210 (for example, the system bandwidth may include channel bandwidths 215 dedicated to distributed RUs). In another example, a system bandwidth may reserve a quantity of channel bandwidths 215 (for example, one or two channel bandwidths) for distributed RUs 210, while the rest of the system bandwidth may be unassociated with distributed RUs 210 (for example, may be associated with RUs that are large or not PSD-limited).

Figure 3:
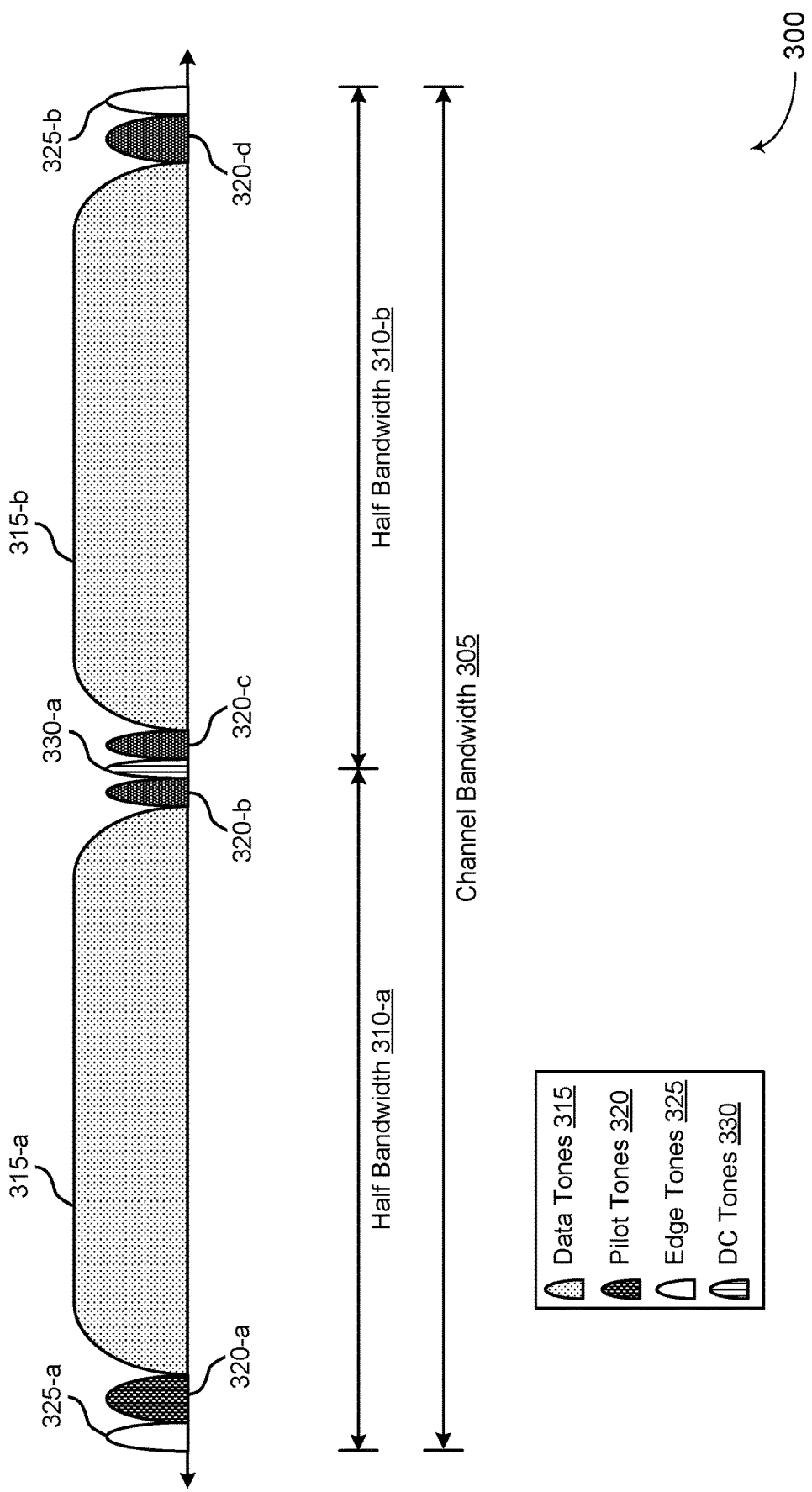
FIG. 3 shows an example channel bandwidth configuration usable for distributed resource unit (RU) configurations.

FIG. 3 shows an example channel bandwidth configuration 300 usable for distributed RU configurations. The channel bandwidth configuration 300 may define possible tone allocations for a channel bandwidth 305, which may be an example of the channel bandwidth 215 described with reference to FIG. 2. The channel bandwidth configuration 300 may support transmission of data tones 315 and pilot tones 320 distributed across the channel bandwidth 305 for a quantity of distributed RUs.

The channel bandwidth 305 may include a set of useful tones (for example, tones carrying information, such as data or pilot signals) and a set of unallocated or extra tones (for example, tones not carrying data or pilot signals). The unallocated tones may act as a buffer or may be used for interference cancelation. In the example illustrated in FIG. 3, data tones 315-*a* and 315-*b* and pilot tones 320-*a*, 320-*b*, 320-*c*, and 320-*d* may be examples of useful tones, while edge tones 325-*a* and 325-*b* and DC tones 330-*a* may be examples of unallocated tones. In some implementations, the edge tones 325-*a* may be referred to as leading unallocated edge tones and the edge tones 325-*b* may be referred to as following or trailing unallocated edge tones.

The DC tones 330-*a* may span a quantity of tones in a center of the channel bandwidth 305. In the illustrated example, the channel bandwidth 305 includes two half bandwidths 310 (for example, half bandwidths 310-*a* and 310-*b*), which, in some implementations, may be referred to as a negative half bandwidth 310-*a* and a positive half bandwidth 310-*b*. Each half bandwidth 310 may include a subset of the data tones 315 and a subset of the pilot tones 320 bordered by unallocated tones (for example, the edge tones 325 or a portion of the DC tones 330-*a*). The data tones 315 and the pilot tones 320 may include tones allocated for multiple distributed RUs. In some aspects, some or all (for example, a majority) of the tones in the data tones 315 may be examples of grouped contiguous tones. In some implementations, the data tones may be grouped contiguous tones, while the pilot tones may not be. Example mappings of the data tones and pilot tones to distributed RUs within respective subsets of the data tones 315 and the pilot tones 320 are described herein with reference to FIG. 4.

Figure 4:
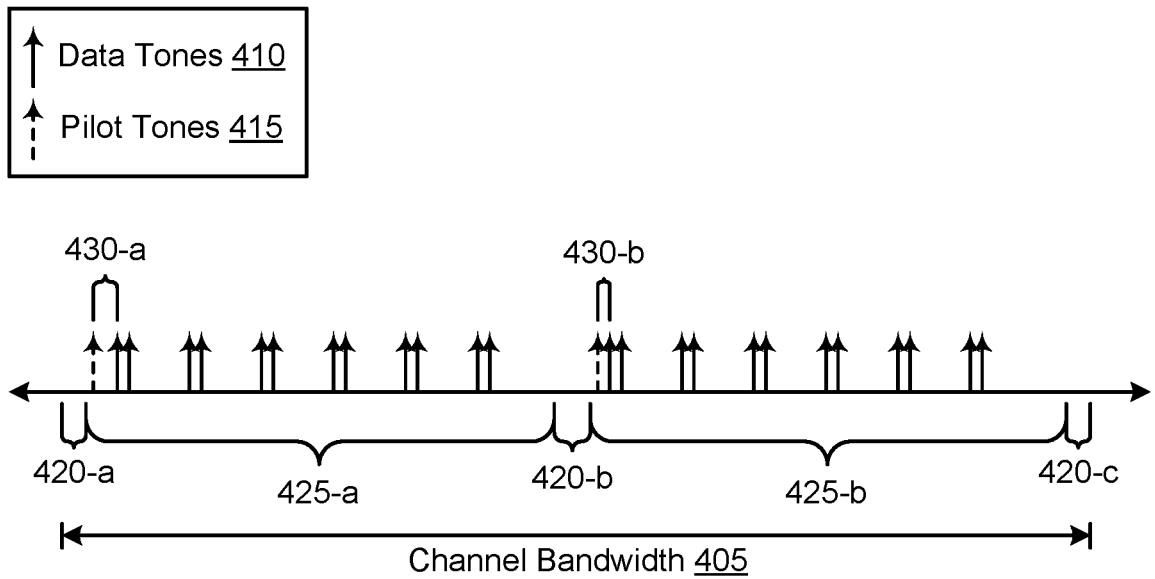
FIG. 4 shows an example tone mapping configuration usable for distributed RU configurations.

FIG. 4 shows an example tone mapping configuration 400 usable for distributed RU configurations. The tone mapping configuration 400 illustrates an example of data tone 410 and pilot tone 415 mapping for a distributed RU. A channel bandwidth 405 may include unallocated tones 420 (for example, including unallocated edge tones 420-a and 420-c, and unallocated DC tones 420-b) and useful tones 425 (for example useful tones 425-a and 425-b). The useful tones 425 may include a subset of data tones 410 and a subset of pilot tones 415. The data tones 410 and the pilot tones 415 may include tones allocated for a quantity of different distributed RUs. Some data tones 410 and pilot tones 415 may be allocated for a first distributed RU. For example, the distributed RU may be an example of an RU26, and may include 24 data tones 410 and 2 pilot tones 415. The pilot tones 415 may be mapped to tones that are sufficiently far apart in the channel bandwidth 405 to provide frequency diversity for channel estimation and for other procedures.

The distributed RU illustrated in FIG. 4 may be an example of a logic RU26 at index 1 defined with respect to Table 2. In this example, the pilot tones 415 may be mapped to either edge of the data subsets in each half bandwidth of the channel bandwidth 405. For example, the distributed RU may include at least one pilot tone 415 in either a leading pilot portion or a trailing pilot portion of the first set of the useful tones 425-a and at least one other pilot tone 415 in either the leading pilot portion or trailing pilot portion for the second set of useful tones 425-b.

The distributed RU may be configured such that a defined spacing between different groups of the data tones 410 or between a group of data tones 410 and a pilot tone 415 is greater than or equal to a quantity of tones (for example, greater than or equal to 11 tones or 15 tones). For example, distances 430-a and 430-b may represent tone spacings between groups of tones (including between the data tones 410 and the pilot tones 415). The distance 430-b may represent a defined tone spacing (for example, between a group of data tones 410 and a pilot tone 415). In some examples, the distance 430-b may represent a distance of 11 or more tones. In some implementations, when employing a tone shifting method as described with reference to FIG. 2, the distance 430-b may represent a distance of 15 or more tones. When the distance 430-b represents a distance of 15 or more tones, there may be a maximum of two tones of each subset of 1 MHz within the channel bandwidth 405.

Although the mapping configuration 400 is described herein with respect to a logic RU26, other sizes of logic RUs are supported as described above. In some implementations, larger RU sizes may be based on a smaller sized logic RU (such as an RU26). For example, to support distributed RUs with 52 tones, each logic RU52 may be composed of two logic RU26s (for example, the logic RU26 may be defined according to the tone mapping configurations discussed with reference to FIG. 2). In some examples, a logic RU52 may be formed using physical tones distributed according to the tone plan shown in Table 1 for two logic RU26s of Table 1. Table 5 shows such a configuration:

TABLE 5

Logic RU26 Indices Belonging to Corresponding Logic RU52

| RU52 Logic Index | 1 | 2 | 3 | 4 |
|---|---|---|---|---|
| Covered Logic RU26 Indices | 1, 6 | 2, 7 | 3, 8 | 4, 9 |

In another example, a logic RU52 may be formed using physical tones distributed according to the shifted tone plan shown in Table 3 for two logic RU26s. Such a configuration may be similar to or the same as the configuration shown in Table 5. In some configurations, one or more logic RU26s may be excluded in the RU52 mapping (for example, a logic RU26 at index 5, defined with respect to Table 2).

To support distributed RUs with 106 tones, each logic RU106 may be composed of four logic RU26s. In one specific example, a logic RU106 may be formed using physical tones distributed according to the tone plan shown in Table 1 for four logic RU26s, along with two additional tones (for example, edge tones, DC tones, tones from a dropped logic RU26 such as the logic RU26 at index 5). In other examples, the logic RU106 may be formed using tones for even or odd indexed logic RU26s. Each logic RU106 may include 102 data tones and 4 pilot tones in some examples. Accordingly, four of the eight pilot tones from the four RU26 composing the RU106 may be used as data tones to support RU106 distribution. Table 6 shows one example configuration for distributed RU106 tone locations:

TABLE 6

Logic RU26 Indices and Physical Tone Indices Belonging to Corresponding Logic RU106

| RU106 Logic Index | 1 | 2 |
|---|---|---|
| Covered Logic RU26 Indices | 1, 3, 6, 8 | 2, 4, 7, 9 |
| Covered Edge Tone Indices | −115, 114 | −114, 115 |
| Pilot Tones Switched to Data Tones | −119, −117, 116, 118 | −118, −116, 117, 119 |
| Modified Pilot Tones | −122, −5, 4, 121 | −121, −4, 5, 122 |

In some examples, a logic RU106 may be formed using physical tones distributed according to the shifted tone plan shown in Table 3 for four logic RU26s, along with two additional tones (for example, edge tones, DC tones, tones from a dropped logic RU26 such as the logic RU26 at index 5). As described above, four pilot tones of the four RU26s may be used as data tones. Table 7 shows a possible configuration for distributed RU106 tone locations using a shifted tone plan:

TABLE 7

Logic RU26 Indices and Physical Tone Indices Belonging to Corresponding Logic RU106s, Shifted Tone Plan

| RU106 Logic Index | 1 | 2 |
|---|---|---|
| Covered Logic RU26 Indices | 1, 3, 6, 8 | 2, 4, 7, 9 |
| Covered Edge Tone Indices | −117, 116 | −116, 117 |
| Pilot Tones Switched to Data Tones | −119, 118, −5,4 | −118, 119, −4, 5 |
| Modified Pilot Tones | −121, −7, 6, 120 | −120, −6, 7, 121 |

Figure 5A:
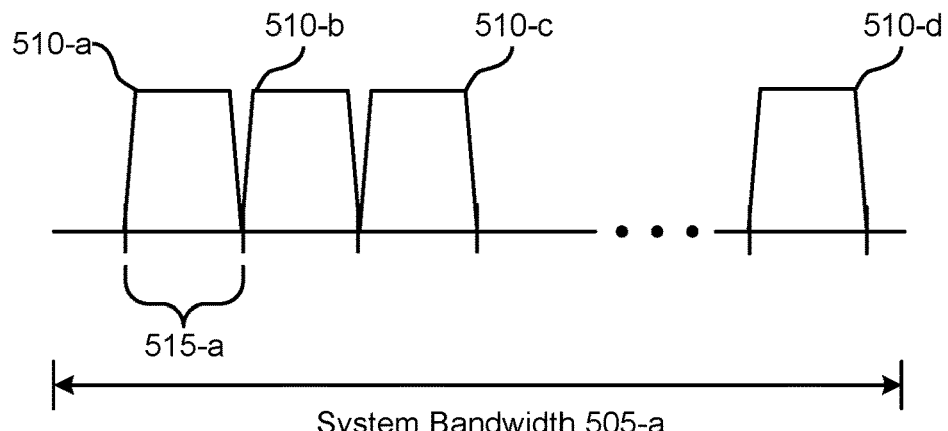
FIGS. 5A, 5B, and 5C show examples of system bandwidth configurations usable for distributed RU configurations.
Figure 5B:
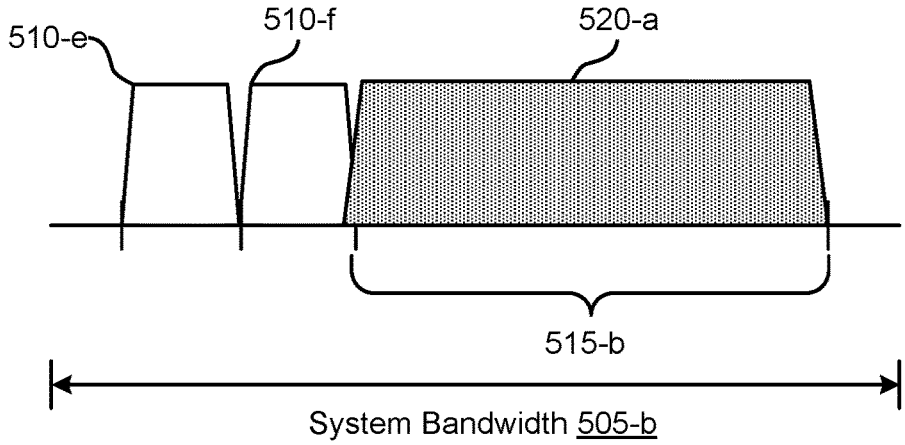
Figure 5C:
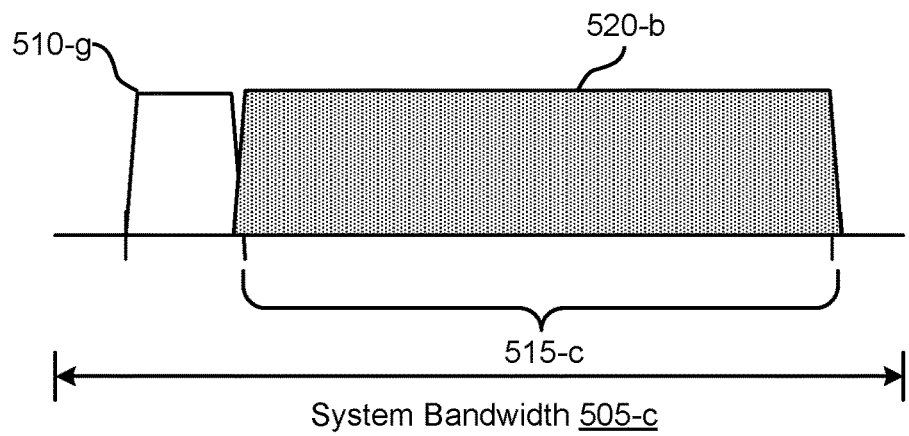

FIGS. 5A, 5B, and 5C show examples of system bandwidth configurations 500 usable for distributed RU configurations. System bandwidths 505 may be configured to support communications over distributed RUs, as illustrated in FIG. 5A. Additionally or alternatively, distributed RU communications may be present in a same system bandwidth 505 as RU communications unassociated with distributed RUs, as illustrated in FIGS. 5B and 5C. Accordingly, the system bandwidths 505 may be configured to support communications over one or more distributed RUs or communications over one or more distributed RUs and one or more non-distributed RUs.

FIG. 5A illustrates a system bandwidth configuration 500-*a* that may support distributed RU communications. The system bandwidth 505-*a* may include one or more channel bandwidths 510 (such as a channel bandwidth described with reference to FIGS. 2-4). Each channel bandwidth 510 may have a bandwidth width 515-*a*. As an example, the bandwidth width 515-*a* may be 20 MHz, as described with reference to FIG. 2. The channel bandwidths 510 may each support one or more distributed RUs as described with reference to FIGS. 2-4. The system bandwidth 505-*a* may include a quantity of channel bandwidths (for example, the channel bandwidths 510-*a*, 510-*b*, and 510-*c*) associated with distributed RUs, up to and including a channel bandwidth 510-*d*, such that the entire system bandwidth 505-*a* may be associated with distributed RUs. The channel bandwidths 510 may utilize a channel bandwidth configuration similar to the configuration described with reference to FIG. 3.

FIG. 5B illustrates a system bandwidth configuration 500-*b* that may support distributed RU communications. The system bandwidth 505-*b* may include two channel bandwidths 510*e* and 510-*f* that may each include one or more distributed RUs as described with reference to FIGS. 2-4. The system bandwidth 505-*b* may also include a channel bandwidth 520-*a* that is unassociated with distributed RUs (for example, associated with RUs that are not distributed, such as large RUs or small RUs without PSD limitations). The channel bandwidths 510-*e* and 510-*f* may utilize a channel bandwidth configuration similar to the configuration described with reference to FIG. 3. A quantity of edge tones may be included within each channel bandwidth 510. The edge tones 325 may provide interference mitigation between the channel bandwidths 510, or between the channel bandwidth 510-*f* and the channel bandwidth 520-*a*.

In some examples, there may be some (for example, five) edge tones located at a left edge of the channel bandwidth 510*e*, which may provide a buffer at an edge of the system bandwidth 505-*b*. There may similarly be some (for example, five) edge tones located at a right edge of the channel bandwidth 510-*e* and some (for example, five) edge tones located at a left edge of the channel bandwidth 510-*f*, which may together provide a buffer between the channel bandwidths 510-*e* and 510-*f*. In some implementations, edge tones at a right edge of the channel bandwidth 510-*f* may overlap with the channel bandwidth 520-*a*.

In some examples, a subset of edge tones (for example, four of five edge tones) located at the right edge of the channel bandwidth 510-*f* may overlap with the channel bandwidth 520-*a*. However, because edge tones may be unallocated tones, such overlap may not result in interference between the two channel bandwidths. In some implementations, overlapping edge tones between neighboring channel bandwidths may be configured such that the channel bandwidths 510 and 520-*a* fit within the system bandwidth 505-*b*. Additionally or alternatively, a device may shift one or more channel bandwidths located at the edge of the system bandwidth 505-*b* such that the edges of the channel bandwidth(s) 510 or channel bandwidth 520-*a* and the system bandwidth 505-*b* are aligned. In some examples, the system bandwidth 505-*b* may be 80 MHz and the channel bandwidths 510-*e* and 510-*f* may each be 20 MHz, such that the channel bandwidth 520-*a* may have a bandwidth width 515-*b* of 40 MHz.

FIG. 5C illustrates a system bandwidth configuration 500-*c* that may support distributed RU communications. The system bandwidth 505-*c* may include a channel bandwidth 510-*g* and a channel bandwidth 520-*b*. The channel bandwidth 510-*g* may support one or more distributed RUs as described with reference to FIGS. 2-4 and the channel bandwidth 520-*b* may be unassociated with distributed RUs (for example, may be associated with large RUs or small RUs without PSD limitations). The channel bandwidth 510-*g* may utilize a channel bandwidth configuration similar to the configuration described with reference to FIG. 3. In some examples, a left edge of the channel bandwidth 510-*g* may include some (for example, five) edge tones, which may be used as a buffer for the system bandwidth 505-*c*. The edge tones may also be shifted to align the edges of the channel bandwidth 510-*g* and the system bandwidth 505-*c*. The channel bandwidth 510-*g* may also include some (for example, five) edge tones located at a right edge. In some implementations, some (for example, two) of the edge tones on the right edge may overlap with the channel bandwidth 520-*b*. However, because the edge tones may include unallocated tones, such overlap may not result in interference between the two channel bandwidths. In some implementations, such overlap may be configured such that the channel bandwidth 510-*g* and the channel bandwidth 520-*b* fit within the system bandwidth 505-*c*. In some examples, the system bandwidth 505-*c* may be 80 MHz and the channel bandwidth 510-*g* may be 20 MHz, such that the channel bandwidth 520-*b* may have a bandwidth width 515-*c* of 60 MHz.

FIGS. 5A, 5B, and 5C illustrate example configurations for the system bandwidth configurations 500 that support distributed RUs. Other system bandwidth configurations 500 are possible, and channel bandwidths 510 associated with distributed RUs may be organized within a system bandwidth 505, and may or may not be multiplexed with channel bandwidths 520 unassociated with distributed RUs. A system bandwidth 505 may include any quantity of channel bandwidths 510 associated with distributed RUs that may be multiplexed with any quantity of channel bandwidths 520 unassociated with distributed RUs. In some implementations, a system bandwidth 505 may be configured such that at least one channel bandwidth 510 associated with distributed RUs is located at a left edge or a right edge, or both, of a system bandwidth 505. In some implementations, a system bandwidth may be configured such that a channel bandwidth 520 unassociated with distributed RUs is not punctured or otherwise alternated with one or more channel bandwidths 510 associated with distributed RUs (for example, for bandwidth efficiency related to OFDMA transmissions).

Figure 6:
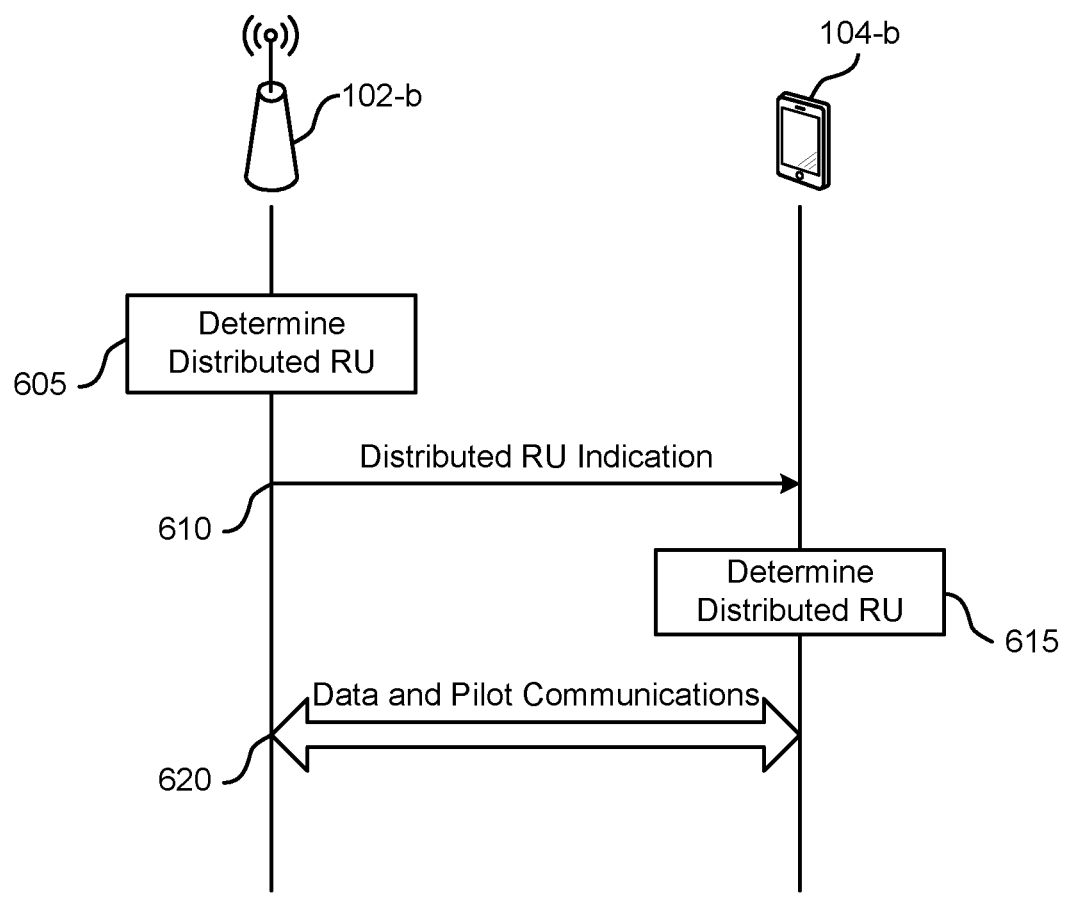
FIG. 6 shows an example timing diagram illustrating an example process for distributed RU configurations.

FIG. 6 shows an example timing diagram 600 illustrating an example process for distributed RU configurations. The timing diagram 600 may be implemented by an AP 102-*b* and a STA 104-*b*, which may be examples of the corresponding devices described with reference to FIGS. 1 and 2. The AP 102-*b* and the STA 104-*b* may communicate using distributed RUs to increase frequency diversity and transmit power utilization. Alternative examples of the timing diagram 600 may be implemented, in which some steps may be performed in a different order than described, some steps may be added, or some steps may not be performed at all. In some implementations, steps may include additional features not mentioned below. Although the AP 102-*b* and the STA 104-*b* are described as implementing the timing diagram 600, any device or any quantity of devices may implement the timing diagram 600.

At 605, the AP 102-b may determine a distributed RU that includes a set of tones distributed across a channel bandwidth that is greater than an aggregate bandwidth of the set of tones. In some examples, the set of tones may include a subset of data tones and a subset of pilot tones. A majority of the tones (for example, approximately 90%) may be examples of distributed groups of one or more contiguous data tones. The pilot tones may be non-contiguous in the channel bandwidth. For example, at least two pilot tones may be sufficiently far apart in the channel bandwidth to provide frequency diversity for channel estimation.

In some implementations, the channel bandwidth may include a portion of leading unallocated edge tones, a first contiguous portion of useful tones, a central portion of unallocated DC tones, a second contiguous portion of useful tones, and a portion of following unallocated edge tones. The portions of useful tones may include data tones (for example, for transmitting data) and pilot tones (for example, for transmitting pilot signals for channel estimation or interference mitigation). In some implementations, the AP 102-b may remap which of the set of tones are allocated as data tones and which are allocated as pilot tones (for example, via one or more shifting operations).

At 610, the AP 102-b may transmit an indication of the distributed RU to the STA 104-b. For example, the AP 102-b may allocate the distributed RU to the STA 104-b such that the STA 104-b may receive information on the downlink, or may allocate the distributed RU to the STA 104-b such that the STA 104-b may transmit information on the uplink. The AP 102-b may additionally allocate other RUs distributed across the channel bandwidth to the STA 104-b or other STAs 104 for communication. For example, in a 20 MHz channel bandwidth in which the RUs include 26 tones, the AP 102-b may allocate up to nine distributed RUs to one or more STAs 104 for communication. In some implementations, the distributed RUs may include more than 26 tones. In such cases, the distributed RUs including more than 26 tones may be formed using multiple logic RUs that include 26 tones each. For example, an RU52 may be formed using two RU26s, and an RU106 may be formed using four RU26s and additional edge tones, among other examples. Additionally, or alternatively, wider channel bandwidths (for example, 40 MHz, 80 MHz, 160 MHz, 320 MHz) may support a larger quantity of distributed RUs.

At 615, the STA 104-b may also determine the distributed RU and the set of tones, including the subset of data tones and the subset of pilot tones. In some implementations, the STA 104-b may determine the distributed RU (for example, including which of the tones are data tones and which are pilot tones) based on the indication from the AP 102-b.

At 620, the AP 102-b and the STA 104-b may communicate using the set of tones of the distributed RU. In a first example, the AP 102-b may transmit data over the subset of data tones to the STA 104-b on the downlink. The AP 102-b may also transmit one or more pilot signals over the set of pilot tones of the identified set of tones to the STA 104-b. In a second example, the STA 104-b may transmit data over the subset of data tones to the AP 102-b on the uplink. The STA 104-b may also transmit one or more pilot signals over the set of pilot tones to the AP 102-b. In some implementations, if the data is included with an example of a compressed 2×LTF, the transmitting device may transmit the LTF over one of each group of contiguous data tones. In some implementations, if the data is included with an example of a compressed 2×LTF, the transmitting device may transmit the pilot signals over all the pilot tones.

Figure 7:
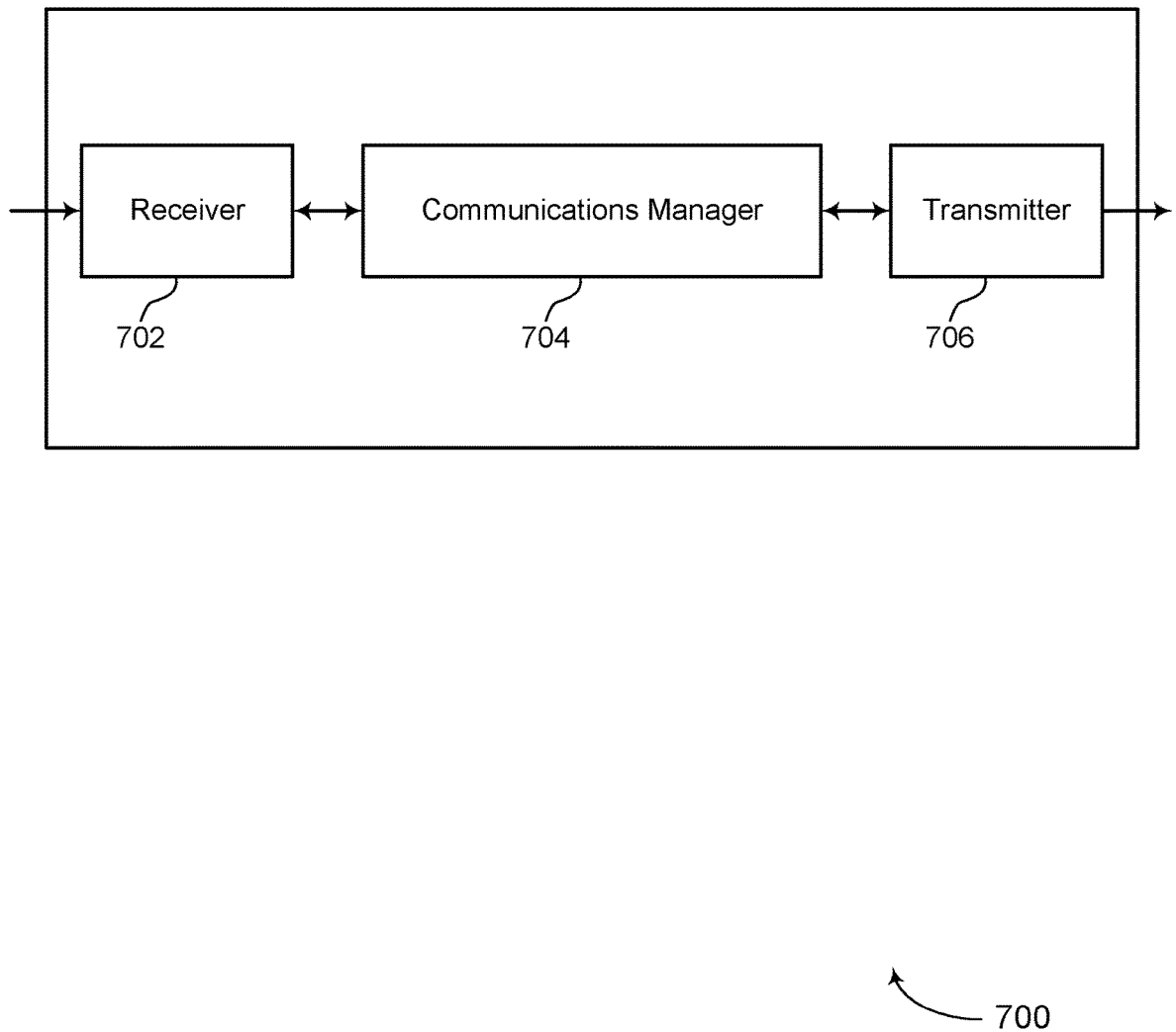
FIG. 7 shows a block diagram of an example wireless communication device for use in wireless communication according to some implementations.

FIG. 7 shows a block diagram of an example wireless communication device 700 for use in wireless communication according to some implementations. In some implementations, the wireless communication device 700 is configured to perform one or more of the processes 1100 and 1200 described above with reference to FIGS. 11 and 12, respectively. In some implementations, the wireless communication device 700 can be an example implementation of an AP 102 or a STA 104 described herein with reference to FIGS. 1, 2, and 6. For example, the wireless communication device 700 can be a chip, SoC, chipset, package or device that includes at least one processor and at least one modem (for example, a Wi-Fi (IEEE 802.11) modem or a cellular modem).

In some such implementations, the wireless communication device 700 can be a device for use in an AP, such as one of the APs 102 described above with reference to FIGS. 1, 2, and 6. In some other implementations, the wireless communication device 700 can be an AP that includes such a chip, SoC, chipset, package or device as well as at least one transmitter, at least one receiver, and at least one antenna. In some such implementations, the wireless communication device 700 can additionally or alternatively be a device for use in a STA, such as one of the STAs 104 described above with reference to FIGS. 1, 2, and 6. In some other implementations, the wireless communication device 700 can be a STA that includes such a chip, SoC, chipset, package or device as well as at least one transmitter, at least one receiver, and at least one antenna.

The wireless communication device 700 may include a receiver 702, a communications manager 704, and a transmitter 706. Portions of one or more of the modules 702, 704, and 706 may be implemented at least in part in hardware or firmware. For example, the communications manager 704 may be implemented at least in part by a modem. In some implementations, at least some of the modules 702, 704, and 706 are implemented at least in part as software stored in a memory. For example, portions of one or more of the modules 702, 704, and 706 can be implemented as non-transitory instructions (or "code") executable by a processor to perform the functions or operations of the respective module.

The receiver 702 is configured to receive information such as packets, user data, or control information associated with various information channels (for example, control channels, data channels, and information related to distributed RU configurations). Information may be passed on to other components of the device. The receiver 702 may be an example of aspects of the transceiver 1008 described with reference to FIG. 10. The receiver 702 may utilize a single antenna or a set of antennas.

The communications manager 704 is configured to determine a distributed RU that includes a set of tones distributed across a channel bandwidth, the channel bandwidth including a greater quantity of tones than an aggregate total number of tones of the set of tones, communicate data over a set of data tones, and communicate one or more pilot signals over a set of pilot tones. In some examples, the set of tones includes the set of data tones and the set of pilot tones. In some examples the set of data tones includes multiple distributed groups of data tones, each group of data tones including one or more data tones of the set of data tones, each group of data tones being spaced apart from each other group of data tones by at least one tone. In some examples the set of pilot tones includes multiple pilot tones, each pilot tone being spaced apart from each other pilot tone by at least one tone.

The transmitter 706 is configured to transmit signals generated by other components of the device. In some examples, the transmitter 706 may be collocated with a receiver 702 in a transceiver module. For example, the transmitter 706 may be an example of aspects of the transceiver 1008 described with reference to FIG. 10. The transmitter 706 may utilize a single antenna or a set of antennas.

The actions performed by the communications manager 704 may be implemented to realize one or more potential advantages. For example, communications manager 704 may increase communication reliability and decrease communication latency at a STA or an AP by using a distributed RU for communications, which may increase communication quality, among other advantages. Similarly, communications manager 704 may save power at the STA or the AP by strategically improving communication quality.

Figure 8:
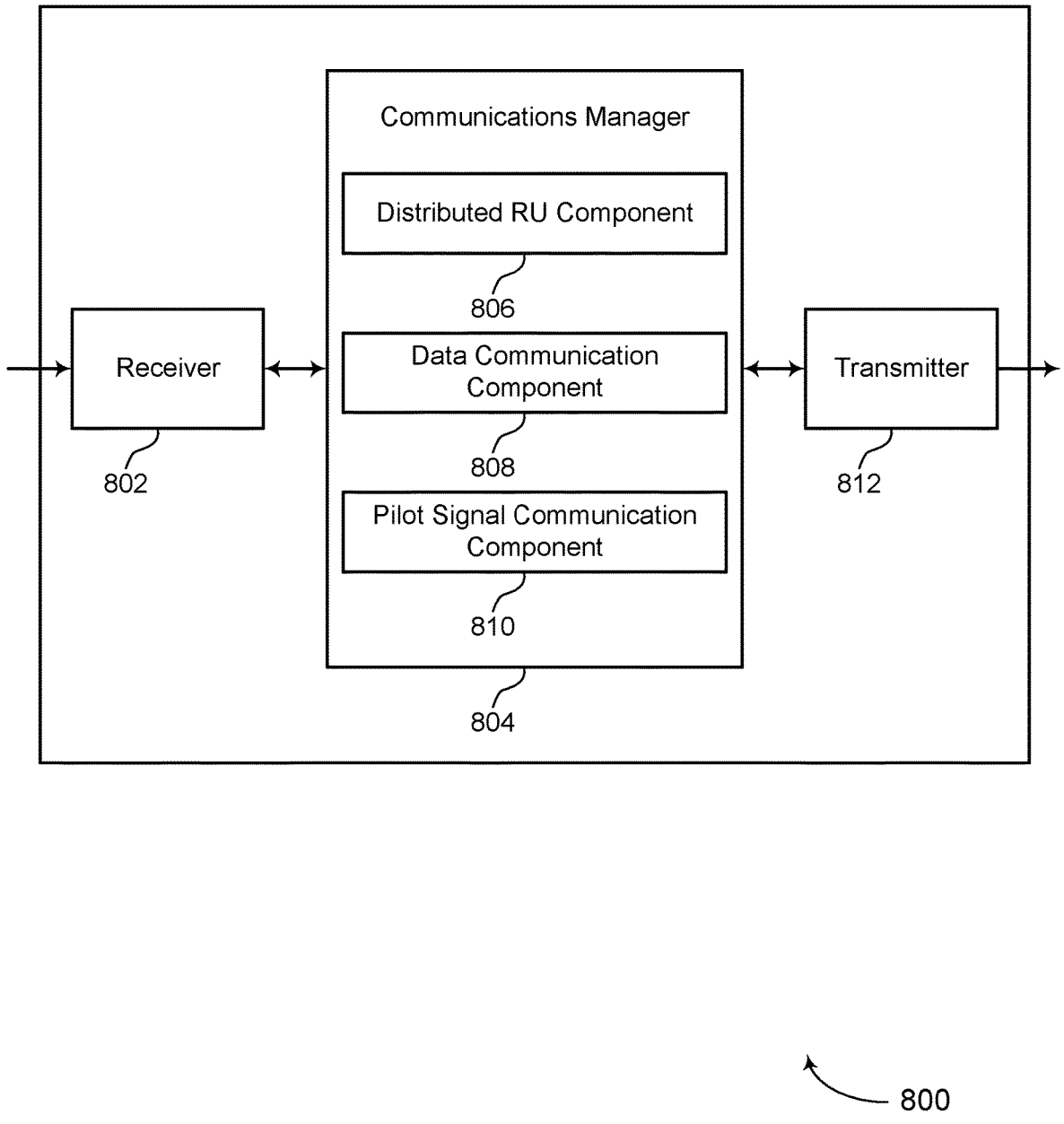
FIG. 8 shows a block diagram of an example wireless communication device for use in wireless communication according to some implementations.

FIG. 8 shows a block diagram of an example wireless communication device 800 for use in wireless communication according to some implementations. In some implementations, the wireless communication device 800 is configured to perform one or more of the processes 1100 and 1200 described above with reference to FIGS. 11 and 12, respectively. In some implementations, the wireless communication device 800 can be an example implementation of a wireless communication device 700 described herein with reference to FIG. 7. For example, the wireless communication device 800 can be a chip, SoC, chipset, package or device that includes at least one processor and at least one modem (for example, a Wi-Fi (IEEE 802.11) modem or a cellular modem).

In some such implementations, the wireless communication device 800 can be a device for use in an AP, such as one of the APs 102 described above with reference to FIGS. 1, 2, and 6. In some other implementations, the wireless communication device 800 can be an AP that includes such a chip, SoC, chipset, package or device as well as at least one transmitter, at least one receiver, and at least one antenna. In some such implementations, the wireless communication device 800 can additionally or alternatively be a device for use in a STA, such as one of the STAs 104 described above with reference to FIGS. 1, 2, and 6. In some other implementations, the wireless communication device 800 can be a STA that includes such a chip, SoC, chipset, package or device as well as at least one transmitter, at least one receiver, and at least one antenna.

The wireless communication device 800 includes a receiver 802, a communications manager 804, a distributed RU component 806, a data communication component 808, a pilot signal communication component 810, and a transmitter 812. Portions of one or more of the modules 802, 804, 806, 808, 810, and 812 may be implemented at least in part in hardware or firmware. For example, the communications manager 804, distributed RU component 806, data communication component 808, and pilot signal communication component 810 may be implemented at least in part by a modem. In some implementations, at least some of the modules 802, 804, 806, 808, 810, and 812 are implemented at least in part as software stored in a memory. For example, portions of one or more of the modules 802, 804, 806, 808, 810, and 812 can be implemented as non-transitory instructions (or "code") executable by a processor to perform the functions or operations of the respective module.

The receiver 802 is configured to receive information such as packets, user data, or control information associated with various information channels (for example, control channels, data channels, and information related to distributed RU configurations). Information may be passed on to other components of the device. The receiver 802 may be an example of aspects of the transceiver 1008 described with reference to FIG. 10. The receiver 802 may utilize a single antenna or a set of antennas.

The communications manager 804 may be an example of aspects of the communications manager 704. The communications manager 804 is configured to include a distributed RU component 806, a data communication component 808, and a pilot signal communication component 810.

The distributed RU component 806 is configured to determine a distributed RU that includes a set of tones distributed across a channel bandwidth, the channel bandwidth including a greater quantity of tones than an aggregate total number of tones of the set of tones, communicate data over a set of data tones, and communicate one or more pilot signals over a set of pilot tones. In some examples, the set of tones includes the set of data tones and the set of pilot tones. In some examples the set of data tones includes multiple distributed groups of data tones, each group of data tones including one or more data tones of the set of data tones, each group of data tones being spaced apart from each other group of data tones by at least one tone. In some examples the set of pilot tones includes multiple pilot tones, each pilot tone being spaced apart from each other pilot tone by at least one tone.

The data communication component 808 is configured to communicate data over the set of data tones.

The pilot signal communication component 810 is configured to communicate one or more pilot signals over the set of pilot tones.

The transmitter 812 is configured to transmit signals generated by other components of the device. In some examples, the transmitter 812 may be collocated with a receiver 802 in a transceiver module. For example, the transmitter 812 may be an example of aspects of the transceiver 1008 described with reference to FIG. 10. The transmitter 812 may utilize a single antenna or a set of antennas.

A processor of the wireless communication device 800 (for example, controlling the receiver 802 or the transmitter 812) may increase communication reliability and accuracy by enabling the wireless communication device 800 to communicate using a distributed RU and increase communication quality (for example, via implementation of system components described with reference to FIG. 9). Further, the processor of the wireless communication device 800 may identify one or more aspects of the distributed RU to perform the processes described herein. The processor of the wireless communication device 800 may use the distributed RU and thereby increase communication quality and communication reliability, as well as save power at the wireless communication device 800 (for example, by strategically using the distributed RO for wireless communications).

Figure 9:
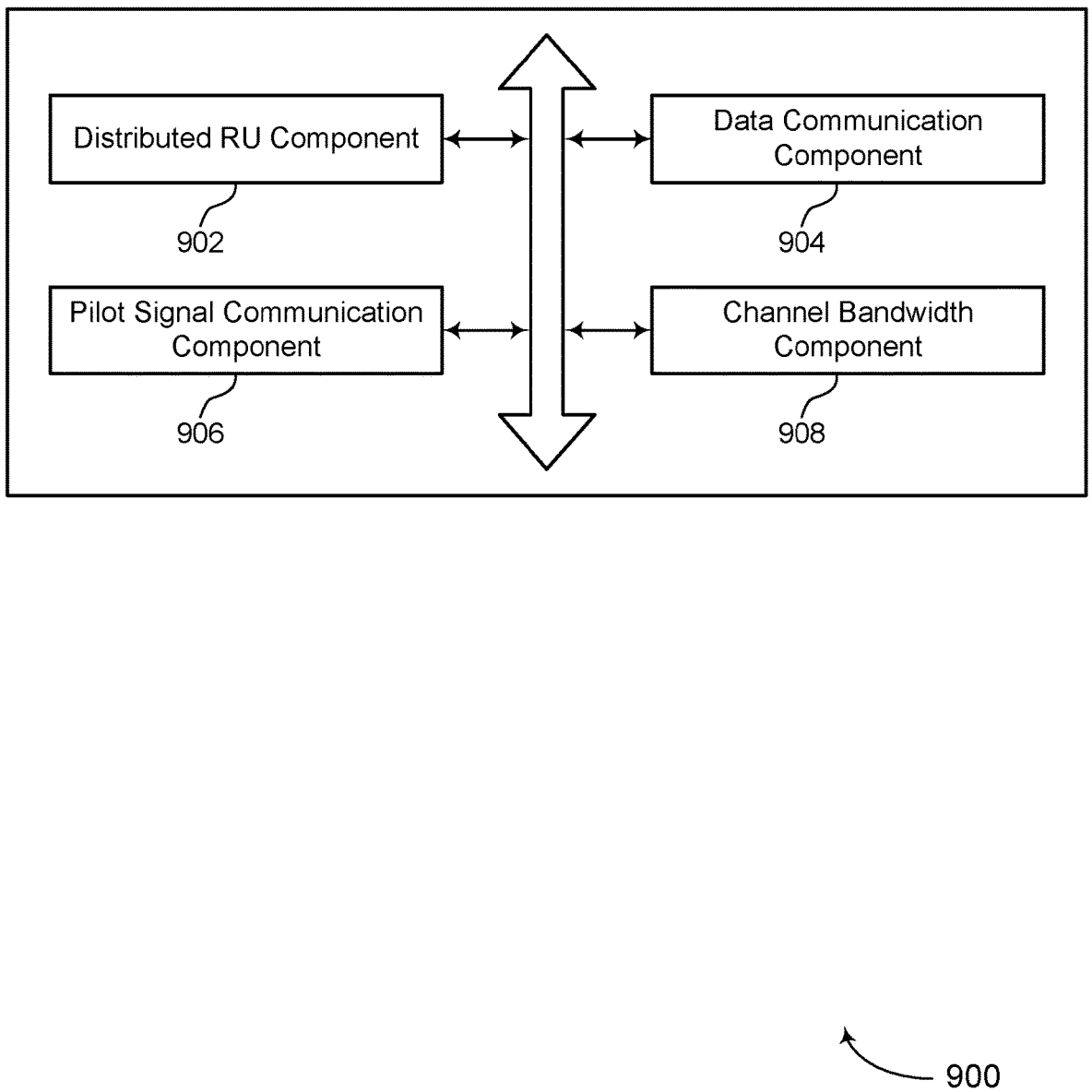
FIG. 9 shows a block diagram of an example communications manager for use in wireless communication according to some implementations.

FIG. 9 shows a block diagram of an example communications manager 900 for use in wireless communication according to some implementations. The communications manager 900 may be an example of aspects of a communications manager 704, a communications manager 804, or a communications manager 1004 described herein. The communications manager 900 may include a distributed RU component 902, a data communication component 904, a pilot signal communication component 906, and a channel bandwidth component 908. Each of these modules may communicate, directly or indirectly, with one another (for example, via one or more buses).

The communications manager 900 includes a distributed RU component 902, a data communication component 904, a pilot signal communication component 906, and a channel bandwidth component 908. Portions of one or more of the modules 900, 902, 904, 906, and 908 may be implemented at least in part in hardware or firmware. For example, the communications manager 900, distributed RU component 902, data communication component 904, pilot signal communication component 906, and channel bandwidth component 908 may be implemented at least in part by a modem. In some implementations, at least some of the modules 900, 902, 904, 906, and 908 are implemented at least in part as software stored in a memory. For example, portions of one or more of the modules 900, 902, 904, 906, and 908 can be implemented as non-transitory instructions (or "code") executable by a processor to perform the functions or operations of the respective module.

The distributed RU component 902 is configured to determine a distributed RU that includes a set of tones distributed across a channel bandwidth, the channel bandwidth including a greater quantity of tones than an aggregate total number of tones of the set of tones. In some examples, the set of tones includes a set of data tones and a set of pilot tones. In some examples the set of data tones includes multiple distributed groups of data tones, each group of data tones including one or more data tones of the set of data tones, each group of data tones being spaced apart from each other group of data tones by at least one tone. In some examples the set of pilot tones includes multiple pilot tones, each pilot tone being spaced apart from each other pilot tone by at least one tone. In some examples, each group of data tones consists of a pair of contiguous data tones. In some examples, each group of data tones consists of a group of contiguous data tones.

In some examples, the distributed RU component 902 is configured to determine which tones of the set of tones include the set of data tones. In some examples, the distributed RU component 902 is configured to determine which tones of the set of tones include the set of pilot tones. In some examples, the distributed RU component 902 is configured to communicate on each tone of the set of tones at a maximum communication power. In some examples, the distributed RU component 902 is configured to determine the set of tones based on one or more sets of defined tone indices, the one or more sets of defined tone indices associated with determining tone positions for one or more non-distributed resource units.

In some examples, the distributed RU component 902 is configured to shift the one or more sets of defined tone indices, in which shifting the one or more sets of defined tone indices includes shifting tones associated with the one or more sets of defined tone indices in a frequency domain. In some examples, the distributed RU component 902 is configured to determine the set of data tones and the set of pilot tones based on shifting the one or more sets of defined tone indices. In some examples, the distributed RU component 902 is configured to allocate the channel bandwidth for a set of logic distributed RUs, in which each logic distributed RU includes a respective set of pilot tones including two or more pilot tones separated by one or more tones and a respective set of data tones including distributed groups of data tones, each group of data tones being spaced apart from each other group of data tones by at least one tone. In some examples, pilot tones for the set of logic distributed RUs form the contiguous portions of pilot tones.

In some examples, the distributed RU component 902 is configured to interleave the set of tones in the channel bandwidth for the distributed RU. In some implementations, a subset of the channel bandwidth includes one tone or two tones of the set of tones. In some implementations, the subset includes 1 MHz of the channel bandwidth.

In some implementations, the channel bandwidth includes one or more leading unallocated edge tones, a first contiguous set of useful tones, one or more unallocated direct current tones, second contiguous set of useful tones, and one or more following unallocated edge tones. In some implementations, the set of tones includes tones from the first contiguous set of useful tones and the second contiguous set of useful tones. In some implementations, the first contiguous set of useful tones includes a first contiguous set of pilot tones, a first contiguous set of data tones, and a second contiguous set of pilot tones. In some implementations, the second contiguous set of useful tones includes a third contiguous set of pilot tones, a second contiguous set of data tones, and a fourth contiguous set of pilot tones. In some implementations, the set of data tones includes tones from the first contiguous set of data tones and the second contiguous set of data tones. In some implementations, the set of pilot tones includes tones from one or more of the first contiguous set of pilot tones, the second contiguous set of pilot tones, the third contiguous set of pilot tones, or the fourth contiguous set of pilot tones.

In some implementations, the distributed RU includes a single logic distributed RU of the set of logic distributed RUs. In some implementations, the first and fourth contiguous sets of pilot tones each include at least nine tones. In some examples, the second and third contiguous sets of pilot tones each include less than three tones. In some implementations, the first and fourth contiguous sets of pilot tones each include less than eight tones. In some examples, the second and third contiguous sets of pilot tones each include at least four tones.

In some implementations, the set of data tones includes at least 90% of the set of tones. In some implementations, the distributed RU includes 26 tones, 52 tones, or 106 tones. In some implementations, the channel bandwidth includes 20 MHz. In some implementations, the distributed RU includes 52 tones or 106 tones. In some examples, the set of data tones includes all data tones of multiple distributed RUs including 26 tones. In some implementations, the set of pilot tones includes all pilot tones of at least two distributed RUs including 26 tones.

In some implementations, each pilot tone or distributed group of data tones is at least 11 tones apart from other tones of the set of tones. In some implementations, one or more tones of the set of tones has a lower power level than a second one or more tones of the set of tones. In some implementations, each pilot tone or distributed group of data tones is at least 15 tones apart from other tones of the set of tones.

The data communication component 904 is configured to communicate data over the set of data tones. In some examples, the data communication component 904 is configured to transmit or receive the data over one data tone in each of the distributed groups of data tones. In some implementations, the data includes a 20 MHz STF.

The pilot signal communication component 906 is configured to communicate pilot symbols over the set of pilot tones. In some examples, the pilot signal communication component 906 is configured to transmit or receive all pilot symbols.

The channel bandwidth component 908 may configure a system bandwidth to include one or more dedicated channel bandwidths associated with distributed RUs, the one or more dedicated channel bandwidths each including the channel bandwidth, and a channel bandwidth unassociated with distributed RUs. In some implementations, the one or more dedicated channel bandwidths and the channel bandwidth unassociated with distributed RUs are non-alternating. In some implementations, a first channel bandwidth of the one or more dedicated channel bandwidths is located at an edge of the system bandwidth. In some implementations, a system bandwidth includes multiple dedicated channel bandwidths associated with distributed RUs, the multiple dedicated channel bandwidths including the channel bandwidth.

Figure 10:
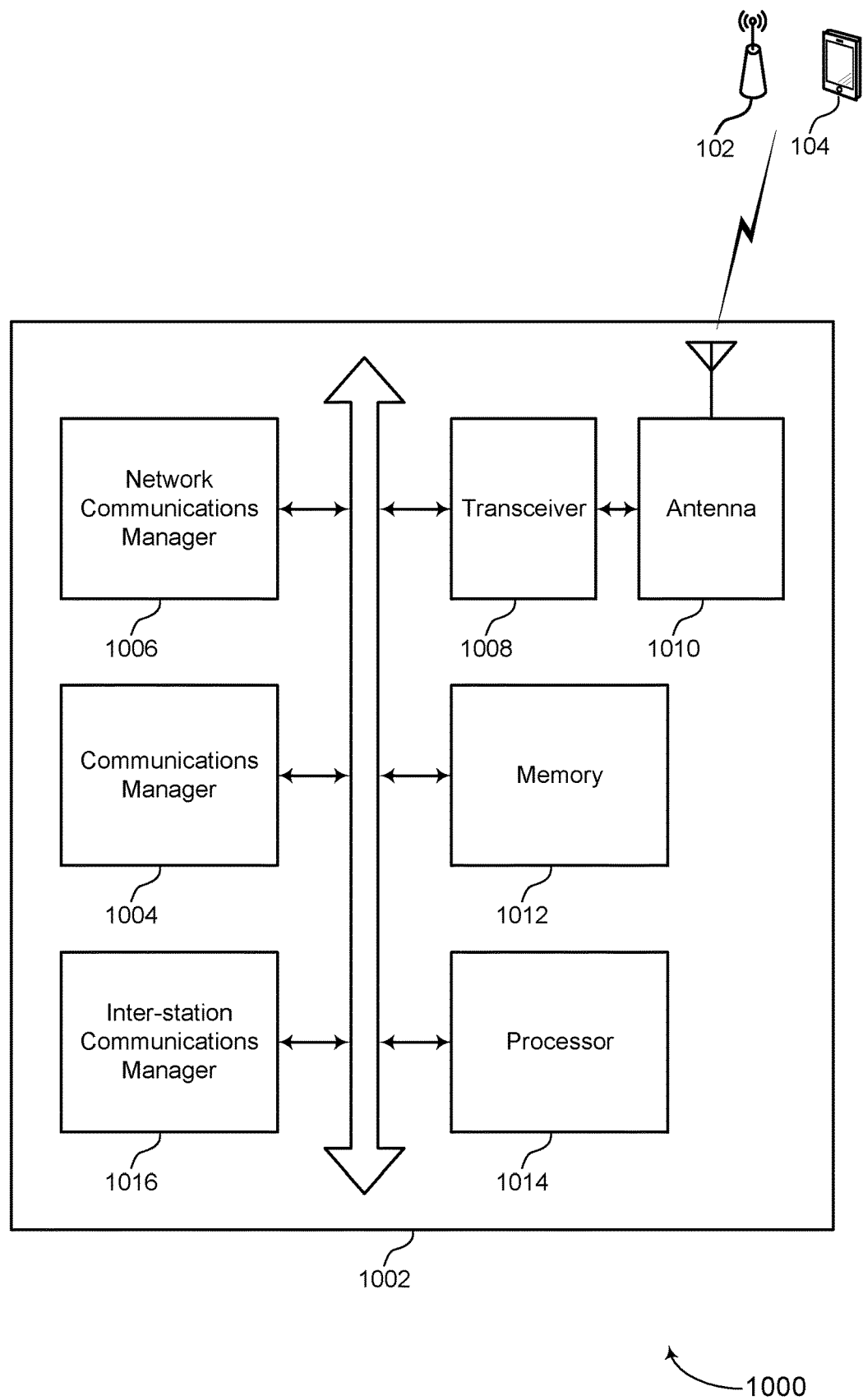
FIG. 10 shows a block diagram of an example wireless communication system for use in wireless communication according to some implementations.

FIG. 10 shows a block diagram of an example wireless communication system 1000 for use in wireless communication according to some implementations. A wireless communication device 1002 may be configured to perform one or more of the processes 1100 and 1200 described above with reference to FIGS. 11 and 12, respectively. In some implementations, the wireless communication device 1002 can be an example implementation of wireless communication device described herein with reference to FIGS. 7 and 8. For example, the wireless communication device 1002 can be a chip, SoC, chipset, package or device that includes at least one processor and at least one modem (for example, a Wi-Fi (IEEE 802.11) modem or a cellular modem).

In some such implementations, the wireless communication device 1002 can be a device for use in an AP, such as one of the APs 102 described above with reference to FIGS. 1, 2, and 6. In some other implementations, the wireless communication device 1002 can be an AP that includes such a chip, SoC, chipset, package or device as well as at least one transmitter, at least one receiver, and at least one antenna. In some such implementations, the wireless communication device 1002 can additionally or alternatively be a device for use in a STA, such as one of the STAs 104 described above with reference to FIGS. 1, 2, and 6. In some other implementations, the wireless communication device 1002 can be a STA that includes such a chip, SoC, chipset, package or device as well as at least one transmitter, at least one receiver, and at least one antenna.

The wireless communication device 1002 includes a communications manager 1004, a communications manager 1006, a transceiver 1008, one or more antennas 1010, memory 1012, a processor 1014, and an inter-station communications manager 1016. Portions of one or more of the modules 1004, 1006, 1008, 1010, 1012, 1014, and 1016 may be implemented at least in part in hardware or firmware. For example, the communications manager 1006 at least in part by a modem. In some implementations, at least some of the modules 1004, 1006, 1008, 1010, 1012, 1014, and 1016 are implemented at least in part as software stored in a memory. For example, portions of one or more of the modules 1004, 1006, 1008, 1010, 1012, 1014, and 1016 can be implemented as non-transitory instructions (or "code") executable by a processor to perform the functions or operations of the respective module.

The communications manager 1004 is configured to determine a distributed RU that includes a set of tones distributed across a channel bandwidth, the channel bandwidth including a greater quantity of tones than an aggregate total number of tones of the set of tones, communicate data over a set of data tones, and communicate one or more pilot signals over a set of pilot tones. In some examples, the set of tones includes the set of data tones and the set of pilot tones. In some examples the set of data tones includes multiple distributed groups of data tones, each group of data tones including one or more data tones of the set of data tones, each group of data tones being spaced apart from each other group of data tones by at least one tone. In some examples the set of pilot tones includes multiple pilot tones, each pilot tone being spaced apart from each other pilot tone by at least one tone.

The network communications manager 1006 is configured to manage communications with the core network (for example, via one or more wired backhaul links). For example, the network communications manager 1006 is configured to manage the transfer of data communications for client devices, such as one or more STAs 104.

The transceiver 1008 is configured to communicate bi-directionally, via one or more antennas, wired, or wireless links as described above. For example, the transceiver 1008 may represent a wireless transceiver and may communicate bi-directionally with another wireless transceiver. The transceiver 1008 may also include a modem to modulate the packets and provide the modulated packets to the antennas for transmission, and to demodulate packets received from the antennas.

In some implementations, the wireless device may include a single antenna 1010. However, in some implementations the device may have more than one antenna 1010, which may be capable of concurrently transmitting or receiving multiple wireless transmissions.

The memory 1012 may include random access memory (RAM) and read only memory (ROM). The memory 1012 may store computer-readable, computer-executable code 1035 including instructions that, when executed, cause the processor to perform various functions described herein. In some implementations, the memory 1012 may include, among other things, a basic input/output system (BIOS) which may control basic hardware or software operation such as the interaction with peripheral components or devices.

The processor 1014 may include an intelligent hardware device, (for example, a general-purpose processor, a digital signal processor (DSP), a CPU, a microcontroller, an application specific integrated circuit (ASIC), a field-programmable gate array (FPGA), a programmable logic device, a discrete gate or transistor logic component, a discrete hardware component, or any combination thereof). In some implementations, the processor 1014 may be configured to operate a memory array using a memory controller. In other cases, a memory controller may be integrated into processor 1014. The processor 1014 may be configured to execute computer-readable instructions stored in a memory to perform various functions (for example, functions or tasks supporting distributed RU configurations).

The inter-station communications manager 1016 is configured to manage communications with other wireless communication devices (for example, the APs 102 or the STAs 104), and may include a controller or scheduler for controlling communications. For example, the inter-station communications manager 1016 may coordinate scheduling for transmissions for various interference mitigation techniques such as beamforming or joint transmission.

Figure 11:
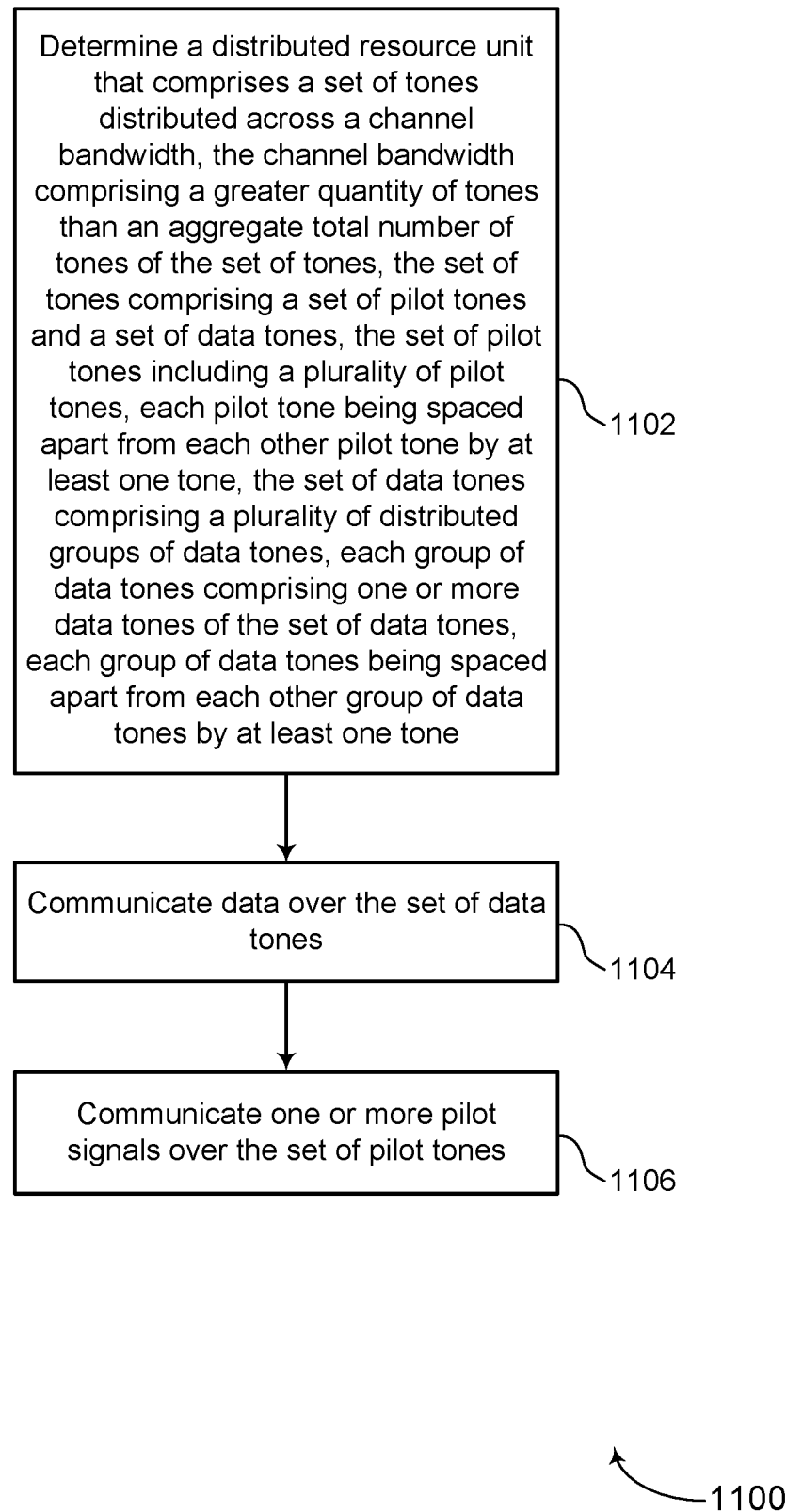
FIG. 11 shows a flowchart illustrating an example process for distributed RU configurations according to some implementations.

FIG. 11 shows a flowchart illustrating an example process 1100 for distributed RU configurations according to some implementations. The process 1100 may be performed by a by a wireless communication device such as the wireless communication device described above with reference to FIGS. 7-9. In some implementations, the process 1100 may be performed by a wireless communication device operating as or within an AP or a STA, such as one of the APs 102 or the STAs 104 described above with reference to FIGS. 1, 2, and 6. In some implementations, the process 1100 begins in block 1102 with determining a distributed RU. In block 1104, the process 1100 proceeds with communicating data. In block 1106, the process 1100 proceeds with communicating one or more pilot signals.

In some implementations, determining the distributed RU in block 1102 includes determining a distributed RU that includes a set of tones distributed across a channel bandwidth, the channel bandwidth including a greater quantity of tones than an aggregate total number of tones of the set of tones. In some examples, the set of tones includes a set of data tones and a set of pilot tones. In some examples the set of data tones includes multiple distributed groups of data tones, each group of data tones including one or more data tones of the set of data tones, each group of data tones being spaced apart from each other group of data tones by at least one tone. In some examples the set of pilot tones includes multiple pilot tones, each pilot tone being spaced apart from each other pilot tone by at least one tone. The operations of 1102 may be performed according to the methods described herein. In some examples, aspects of the operations of 1102 may be performed by a distributed RU component as described with reference to FIGS. 7-10.

In some implementations, communicating the data in block 1104 includes communicating data over the set of data tones. The operations of 1104 may be performed according to the methods described herein. In some examples, aspects of the operations of 1104 may be performed by a data communication component as described with reference to FIGS. 7-10.

In some implementations, communicating the one or more pilot signals in block 1106 includes communicating one or more pilot signals over the set of pilot tones. The operations of 1106 may be performed according to the methods described herein. In some examples, aspects of the operations of 1106 may be performed by a pilot signal communication component as described with reference to FIGS. 7-10.

Figure 12:
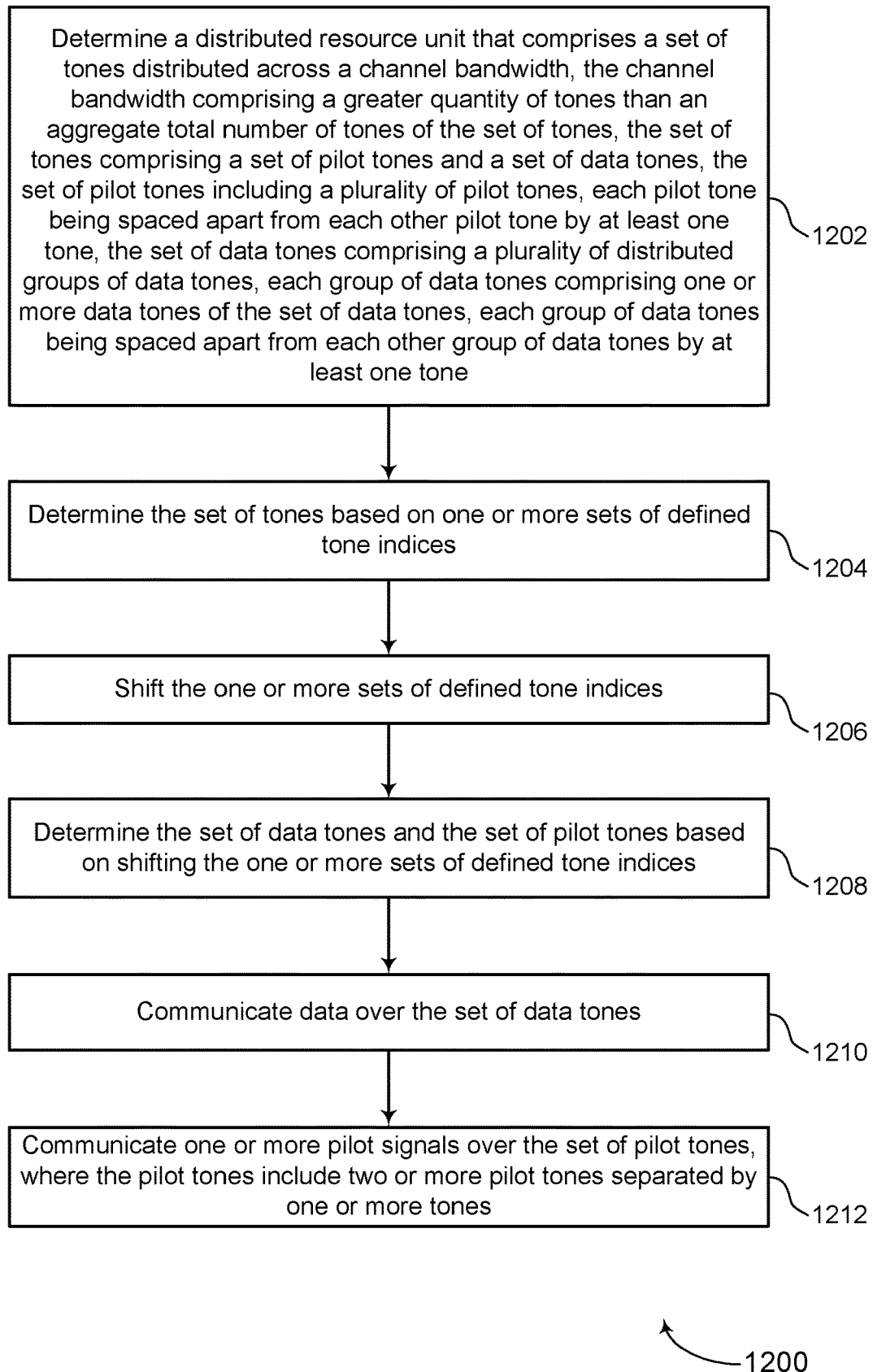
FIG. 12 shows a flowchart illustrating an example process for distributed RU configurations according to some implementations.

FIG. 12 shows a flowchart illustrating an example process 1200 for distributed RU configurations according to some implementations. The process 1200 may be performed by a by a wireless communication device such as the wireless communication device described above with reference to FIGS. 7-9. In some implementations, the process 1200 may be performed by a wireless communication device operating as or within an AP or a STA, such as one of the APs 102 or the STAs 104 described above with reference to FIGS. 1,2, and 6. In some implementations, the process 1200 begins in block 1202 with determining a distributed RU. In block 1204, the process 1200 proceeds with determining a set of tones. In block 1206, the process 1200 proceeds with shifting the set of tones. In block 1208, the process 1200 proceeds with determining a set of data tones and a set of pilot tones. In block 1210, the process 1200 proceeds with communicating data. In block 1212, the process 1200 proceeds with communicating one or more pilot signals.

In some implementations, determining a distributed RU in block 1202 includes determining a distributed RU that includes a set of tones distributed across a channel bandwidth, the channel bandwidth including a greater quantity of tones than an aggregate total number of tones of the set of tones. In some examples, the set of tones includes a set of data tones and a set of pilot tones. In some examples the set of data tones includes multiple distributed groups of data tones, each group of data tones including one or more data tones of the set of data tones, each group of data tones being spaced apart from each other group of data tones by at least one tone. In some examples the set of pilot tones includes multiple pilot tones, each pilot tone being spaced apart from each other pilot tone by at least one tone. The operations of 1202 may be performed according to the methods described herein. In some examples, aspects of the operations of 1202 may be performed by a distributed RU component as described with reference to FIGS. 7-10.

In some implementations, determining the set of tones in block 1204 includes determining the set of tones based on one or more sets of defined tone indices. The operations of 1204 may be performed according to the methods described herein. In some examples, aspects of the operations of 1204 may be performed by a distributed RU component as described with reference to FIGS. 7-10.

In some implementations, shifting the set of tones in block 1206 includes shifting the one or more sets of defined tone indices. The operations of 1206 may be performed according to the methods described herein. In some examples, aspects of the operations of 1206 may be performed by a distributed RU component as described with reference to FIGS. 7-10.

In some implementations, determining the set of data tones and the set of pilot tones in block 1208 includes determining the set of data tones and the set of pilot tones based on shifting the one or more sets of defined tone indices. The operations of 1208 may be performed according to the methods described herein. In some examples, aspects of the operations of 1208 may be performed by a distributed RU component as described with reference to FIGS. 7-10.

In some implementations, communicating the data in block 1210 includes communicating data over the set of data tones. The operations of 1210 may be performed according to the methods described herein. In some examples, aspects of the operations of 1210 may be performed by a data communication component as described with reference to FIGS. 7-10.

In some implementations, communicating the one or more pilot signals in block 1212 includes communicating one or more pilot signals over the set of pilot tones. The operations of 1212 may be performed according to the methods described herein. In some examples, aspects of the operations of 1212 may be performed by a pilot signal communication component as described with reference to FIGS. 7-10.

As used herein, a phrase referring to "at least one of" or "one or more of" a list of items refers to any combination of those items, including single members. For example, "at least one of: a, b, or c" is intended to cover the possibilities of: a only, b only, c only, a combination of a and b, a combination of a and c, a combination of b and c, and a combination of a and b and c.

The various illustrative components, logic, logical blocks, modules, circuits, operations and algorithm processes described in connection with the implementations disclosed herein may be implemented as electronic hardware, firmware, software, or combinations of hardware, firmware or software, including the structures disclosed in this specification and the structural equivalents thereof. The interchangeability of hardware, firmware and software has been described generally, in terms of functionality, and illustrated in the various illustrative components, blocks, modules, circuits and processes described above. Whether such functionality is implemented in hardware, firmware or software depends upon the particular application and design constraints imposed on the overall system.

Various modifications to the implementations described in this disclosure may be readily apparent to persons having ordinary skill in the art, and the generic principles defined herein may be applied to other implementations without departing from the spirit or scope of this disclosure. Thus, the claims are not intended to be limited to the implementations shown herein, but are to be accorded the widest scope consistent with this disclosure, the principles and the novel features disclosed herein.

Additionally, various features that are described in this specification in the context of separate implementations also can be implemented in combination in a single implementation. Conversely, various features that are described in the context of a single implementation also can be implemented in multiple implementations separately or in any suitable subcombination. As such, although features may be described above as acting in particular combinations, and even initially claimed as such, one or more features from a claimed combination can in some implementations be excised from the combination, and the claimed combination may be directed to a subcombination or variation of a subcombination.

Similarly, although operations are depicted in the drawings in a particular order, this should not be understood as requiring that such operations be performed in the particular order shown or in sequential order, or that all illustrated operations be performed, to achieve desirable results. Further, the drawings may schematically depict one more example processes in the form of a flowchart or flow diagram. However, other operations that are not depicted can be incorporated in the example processes that are schematically illustrated. For example, one or more additional operations can be performed before, after, simultaneously, or between any of the illustrated operations. In some circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

What is claimed is:

1. A method for wireless communication by a wireless communication device, comprising:
    determining a distributed resource unit that comprises a set of tones associated with a first resource unit size, wherein the set of tones are distributed across a channel bandwidth associated with a second resource unit size greater than the first resource unit size, the channel bandwidth comprising a greater quantity of tones than an aggregate total number of tones of the set of tones, the set of tones comprising a set of pilot tones and a set of data tones, the set of pilot tones including a plurality of pilot tones, each pilot tone being spaced apart from each other pilot tone within the channel bandwidth by at least one tone, the set of data tones comprising a plurality of distributed groups of data tones, each group of data tones comprising two or more data tones of the set of data tones, each group of data tones being spaced apart from each other group of data tones within the channel bandwidth by at least one tone;
    communicating data over the set of data tones; and
    communicating pilot symbols over the set of pilot tones.

2. The method of claim 1, wherein determining the distributed resource unit comprises:
    determining which tones of the set of tones comprise the set of data tones; and
    determining which tones of the set of tones comprise the set of pilot tones.

3. The method of claim 1, wherein a subset of the channel bandwidth comprises one tone or two tones of the set of tones.

4. The method of claim 3, wherein the subset of the channel bandwidth comprises one megahertz of the channel bandwidth.

5. The method of claim 3, wherein communicating the data comprises communicating on each data tone of the set of tones at a maximum communication power, and wherein communicating the pilot symbols comprises communicating on each pilot tone of the set of tones at the maximum communication power.

6. The method of claim 1, wherein determining the distributed resource unit comprises determining the set of tones based at least in part on one or more sets of defined tone indices, the one or more sets of defined tone indices associated with determining tone positions for one or more non-distributed resource units.

7. The method of claim 6, wherein determining the set of tones comprises:
    shifting the one or more sets of defined tone indices, wherein shifting the one or more sets of defined tone indices comprises shifting tones associated with the one or more sets of defined tone indices in a frequency domain; and
    determining the set of data tones and the set of pilot tones based at least in part on shifting the one or more sets of defined tone indices.

8. The method of claim 1, wherein communicating the data comprises:
    transmitting or receiving the data over one data tone in each distributed group of data tones of the plurality of distributed groups of data tones; and
    transmitting or receiving all of the pilot symbols.

9. The method of claim 1, wherein:
    the channel bandwidth comprises:
        one or more leading unallocated edge tones;
        a first contiguous set of useful tones;
        one or more unallocated direct current tones;
        a second contiguous set of useful tones;
        one or more following unallocated edge tones; and
        the set of tones comprising tones from the first contiguous set of useful tones and the second contiguous set of useful tones.

10. The method of claim 9, wherein:
    the first contiguous set of useful tones comprises:
        a first contiguous set of pilot tones;
        a first contiguous set of data tones; and
        a second contiguous set of pilot tones;
    the second contiguous set of useful tones comprises:
        a third contiguous set of pilot tones;
        a second contiguous set of data tones; and
        a fourth contiguous set of pilot tones;
    the set of data tones comprises tones from the first contiguous set of data tones and the second contiguous set of data tones; and
    the set of pilot tones comprises tones from one or more of the first contiguous set of pilot tones, the second contiguous set of pilot tones, the third contiguous set of pilot tones, or the fourth contiguous set of pilot tones.

11. The method of claim 10, further comprising:
    allocating the channel bandwidth for a plurality of logic distributed resource units, each logic distributed resource unit comprising the set of pilot tones and the set of data tones, wherein pilot tones for the plurality of logic distributed resource units form contiguous portions of pilot tones.

12. The method of claim 11, wherein the distributed resource unit comprises a single logic distributed resource unit of the plurality of logic distributed resource units.

13. The method of claim 1, wherein a system bandwidth comprises a plurality of dedicated channel bandwidths associated with distributed resource units, the plurality of dedicated channel bandwidths comprising the channel bandwidth.

14. The method of claim 1, wherein each pilot tone or distributed group of data tones is at least 11 tones apart from other tones of the set of tones.

15. The method of claim 1, wherein each group of data tones consists of a pair of contiguous data tones.

16. The method of claim 1, wherein each group of data tones consists of a group of contiguous data tones.

17. The method of claim 1, wherein each group of data tones includes a same quantity of data tones.

18. A wireless communication device comprising:
at least one modem;
at least one processor; and
at least one memory communicatively coupled with the at least one processor and storing processor-readable code that, when executed by the at least one processor in conjunction with the at least one modem, is configured to:
determine a distributed resource unit that comprises a set of tones associated with a first resource unit size, wherein the set of tones are distributed across a channel bandwidth associated with a second resource unit size greater than the first resource unit size, the channel bandwidth comprising a greater quantity of tones than an aggregate total number of tones of the set of tones, the set of tones comprising a set of pilot tones and a set of data tones, the set of pilot tones including a plurality of pilot tones, each pilot tone being spaced apart from each other pilot tone within the channel bandwidth by at least one tone, the set of data tones comprising a plurality of distributed groups of data tones, each group of data tones comprising two or more data tones of the set of data tones, each group of data tones being spaced apart from each other group of data tones within the channel bandwidth by at least one tone;
communicate data over the set of data tones; and
communicate pilot symbols over the set of pilot tones.

19. The wireless communication device of claim 18, wherein the processor-readable code to determine the distributed resource unit is executable by the at least one processor to cause the wireless communication device to:
determine which tones of the set of tones comprise the set of data tones; and
determine which tones of the set of tones comprise the set of pilot tones.

20. The wireless communication device of claim 18, wherein a subset of the channel bandwidth comprises one tone or two tones of the set of tones.

21. The wireless communication device of claim 20, wherein the subset of the channel bandwidth comprises one megahertz of the channel bandwidth.

22. The wireless communication device of claim 20, wherein the processor-readable code to communicate the data is executable by the at least one processor to cause the wireless communication device to communicate on each data tone of the set of tones at a maximum communication power, and wherein the processor-readable code to communicate the pilot symbols is executable by the at least one processor to cause the wireless communication device to communicate on each pilot tone of the set of tones at the maximum communication power.

23. The wireless communication device of claim 18, wherein the processor-readable code to determine the distributed resource unit is executable by the at least one processor to cause the wireless communication device to determine the set of tones based at least in part on one or more sets of defined tone indices, the one or more sets of defined tone indices associated with determining tone positions for one or more non-distributed resource units.

24. The wireless communication device of claim 23, wherein the processor-readable code to determine the set of tones is executable by the at least one processor to cause the wireless communication device to:
shift the one or more sets of defined tone indices, wherein shifting the one or more sets of defined tone indices comprises shifting tones associated with the one or more sets of defined tone indices in a frequency domain; and
determine the set of data tones and the set of pilot tones based at least in part on shifting the one or more sets of defined tone indices.

25. The wireless communication device of claim 18, wherein the processor-readable code to communicate the data is executable by the at least one processor to cause the wireless communication device to:
transmit or receiving the data over one data tone in each distributed group of data tones of the plurality of distributed groups of data tones; and
transmit or receiving all of the pilot symbols.

26. The wireless communication device of claim 18, wherein:
the channel bandwidth comprises:
one or more leading unallocated edge tones;
a first contiguous set of useful tones;
one or more unallocated direct current tones;
a second contiguous set of useful tones; and
one or more following unallocated edge tones; and
the set of tones comprises tones from the first contiguous set of useful tones and the second contiguous set of useful tones.

27. The wireless communication device of claim 26, wherein:
the first contiguous set of useful tones comprises:
a first contiguous set of pilot tones;
a first contiguous set of data tones; and
a second contiguous set of pilot tones;
the second contiguous set of useful tones comprises:
a third contiguous set of pilot tones;
a second contiguous set of data tones; and
a fourth contiguous set of pilot tones;
the set of data tones comprises tones from the first contiguous set of data tones and the second contiguous set of data tones; and
the set of pilot tones comprises tones from one or more of the first contiguous set of pilot tones, the second contiguous set of pilot tones, the third contiguous set of pilot tones, or the fourth contiguous set of pilot tones.

28. The wireless communication device of claim 27, wherein the processor-readable code are further executable by the at least one processor to cause the wireless communication device to:
allocate the channel bandwidth for a plurality of logic distributed resource units, each logic distributed resource unit comprising the set of pilot tones and the set of data tones, wherein pilot tones for the plurality of logic distributed resource units form contiguous portions of pilot tones.

29. The wireless communication device of claim 18, wherein a system bandwidth comprises a plurality of dedicated channel bandwidths associated with distributed resource units, the plurality of dedicated channel bandwidths comprising the channel bandwidth.

30. The wireless communication device of claim 18, wherein each pilot tone or distributed group of data tones is at least 11 tones apart from other tones of the set of tones.

31. The wireless communication device of claim 18, wherein each group of data tones consists of a pair of contiguous data tones.

32. The wireless communication device of claim 18, wherein each group of data tones consists of a group of contiguous data tones.

* * * * *